US009948125B2

(12) United States Patent
Groat et al.

(10) Patent No.: US 9,948,125 B2
(45) Date of Patent: Apr. 17, 2018

(54) SYSTEMS AND METHODS FOR SELF-CONTAINED AUTOMATIC BATTERY CHARGING AND BATTERY-LIFE-EXTENSION CHARGING

(71) Applicant: Stored Energy Systems, a Limited Liability Company, Longmont, CO (US)

(72) Inventors: Timothy Groat, Berthoud, CO (US); Kyle Miller, Arvada, CO (US); John Flavin, Golden, CO (US); William Kaewert, Longmont, CO (US)

(73) Assignee: Stored Energy Systems, a Limited Liability Company, Longmont, CO (US)

(*) Notice: Subject to any disclaimer, the term of this patent is extended or adjusted under 35 U.S.C. 154(b) by 8 days.

(21) Appl. No.: 15/258,371

(22) Filed: Sep. 7, 2016

(65) Prior Publication Data
US 2016/0380441 A1 Dec. 29, 2016

Related U.S. Application Data

(63) Continuation-in-part of application No. 14/536,368, filed on Nov. 7, 2014, now Pat. No. 9,466,995.
(Continued)

(51) Int. Cl.
*H02J 7/00* (2006.01)
*H02M 7/04* (2006.01)
*H02J 7/02* (2016.01)

(52) U.S. Cl.
CPC ............ *H02J 7/007* (2013.01); *H02J 7/0045* (2013.01); *H02J 7/022* (2013.01); *H02J 7/0052* (2013.01)

(58) Field of Classification Search
CPC ........... H02J 7/007; H02J 7/0045; H02M 7/04
(Continued)

(56) References Cited

U.S. PATENT DOCUMENTS 5,140,269 A  8/1992 Champlin
5,184,025 A  2/1993 McCurry
(Continued)

FOREIGN PATENT DOCUMENTS

CN  102253348 B  10/2012

OTHER PUBLICATIONS

Marinco—Charge Pro Battery Chargers, www.marinco.com, Milwaukee, WI, copyright 2014, 4 pp.
(Continued)

*Primary Examiner* — Sun Lin
(74) *Attorney, Agent, or Firm* — James A. Sheridan; Sheridan Law, LLC

(57) ABSTRACT

The disclosure provides embodiments of a self-contained automatic battery charging system having a power printed circuit board (PCB) that enables inputting an alternating current (AC) power flow to the automatic battery charging system. A first switchmode converter converts an AC input power to a direct current (DC) power, thereby providing an active power factor correction. The first switchmode converter comprises an isolation transformer, which provides an electrical isolation between a primary circuitry and a secondary circuitry of the automatic battery charging system. A second switch mode converter regulates a system output voltage and limits a system output current to an electrical load. A DC output is connected to a battery, another electrical storage device, and/or a parallel-connected DC load to be powered. An optional accessory PCB electrically connects to the power PCB and provides features including a liquid crystal display (LCD), alarm output relay(s), and/or a
(Continued)

controller area network bus (CANbus) interface. The automatic battery charging system can implement a battery-life-extension charging regime. Other embodiments are disclosed.

20 Claims, 14 Drawing Sheets

Related U.S. Application Data

(60) Provisional application No. 61/901,104, filed on Nov. 7, 2013.

(58) Field of Classification Search
USPC .......................................................... 320/107
See application file for complete search history.

(56) References Cited

U.S. PATENT DOCUMENTS

| | | | |
|---|---|---|---|
| 5,250,904 A | 10/1993 | Salander et al. | |
| 5,598,084 A | 1/1997 | Keith | |
| 5,744,962 A | 4/1998 | Alber et al. | |
| 6,417,668 B1 | 7/2002 | Howard et al. | |
| 6,441,584 B1 | 8/2002 | Crass | |
| 6,469,512 B2 | 10/2002 | Singh et al. | |
| 6,847,192 B2* | 1/2005 | Turner et al. | G06F 1/30 320/166 |
| 6,992,487 B1 | 1/2006 | Steinke | |
| 7,573,239 B2 | 8/2009 | Weston et al. | |
| 7,635,983 B2 | 12/2009 | Pecile | |
| 7,821,234 B2 | 10/2010 | Moriya | |
| 8,198,860 B2 | 6/2012 | Law | |
| 9,231,491 B2 | 1/2016 | Benson | |
| 2002/0153864 A1 | 10/2002 | Bertness | |
| 2002/0175687 A1 | 11/2002 | Bertness | |
| 2003/0025481 A1 | 2/2003 | Bertness | |
| 2006/0262739 A1* | 11/2006 | Ramirez et al. | H04W 88/06 370/311 |
| 2011/0193523 A1 | 8/2011 | Law | |
| 2011/0254582 A1 | 10/2011 | Partee | |
| 2011/0272180 A1 | 11/2011 | Park et al. | |
| 2011/0273181 A1 | 11/2011 | Park et al. | |
| 2013/0062966 A1 | 3/2013 | Verghese | |
| 2015/0351037 A1* | 12/2015 | Brown et al. | H04W 52/0261 455/574 |

OTHER PUBLICATIONS

Computronic Controls—Sentinel 150/UL150, Automatic Switch Mode Battery Chargers, www.computroniccontrols.com, Birmingham, United Kingdom, Feb. 8, 2012, 4 pp.
Computronic Controls—Sentinel 300P, Programmable Switch Mode Battery Chargers, www.computroniccontrols.com, Birmingham, United Kingdome, Oct. 16, 2014, 4 pp.
Computronic Controls—Sentinel 150P, Automatic Switch Mode Battery Chargers, www.computroniccontrols.com, Birmingham, United Kingdom, Jul. 11, 2014, 4 pp.
DSEPower—DES9470, DSE9472, DSE9480 & DSE9481—MKII Intelligent Battery Chargers, www.deepseausa.com, Deep Sea Electronics Inc., Rockford, Illinois, 2 pp.
DESPower—DSE9474—Intelligent Battery Charger, www.deepseausa.com, Deep Sea Electronics Inc., Rockford, Illinois, 2 pp.
LaMARCHE Stationary Battery Informer, www.lamarchemfg.com, La Marche Mfg., Des Plaines, Illinois, 2 pp.

* cited by examiner

SYSTEMS AND METHODS FOR SELF-CONTAINED AUTOMATIC BATTERY CHARGING AND BATTERY-LIFE-EXTENSION CHARGING

CROSS-REFERENCE TO RELATED APPLICATION

This application is a continuation-in-part of pending prior U.S. patent application Ser. No. 14/536,368, filed Nov. 7, 2014 by Timothy Groat, Kyle Miller, and John Flavin for SELF-CONTAINED AUTOMATIC BATTERY CHARGING SYSTEMS AND METHODS, which in turn claims the benefit under 35 U.S.C. 119(e) of U.S. Provisional Patent Application No. 61/901,104, filed Nov. 7, 2013, by Timothy Groat, Kyle Miller, and John Flavin for SELF-CONTAINED AUTOMATIC BATTERY CHARGING SYSTEMS, both of which patent applications are hereby incorporated herein by reference.

BACKGROUND

Generally, a battery charger is an electronic assembly comprising electrical, mechanical, and/or electronic components that together perform multiple functions associated with delivering electrical energy to a battery.

Battery charging is carried out in existing devices in several different ways, including linear dissipative voltage regulators, various types of thyristor regulators, and various types of switchmode regulators. Many existing (commercial) battery chargers are transformer type thyristor-controlled battery chargers that are larger and heavier than switchmode type battery chargers. Existing battery chargers including switchmode type battery chargers usually have a poor power factor (i.e., a ratio of real power flowing to the load to an apparent power in the circuit), and therefore draw more input current than necessary and have a non-sinusoidal AC input current.

Existing battery chargers may provide: reverse polarity protection; jumper selectable output voltage (e.g. twelve-volt or twenty-four volt charging); automatic charge cycles; temperature compensation; electromagnetic interference (EMI) filtering; surge protection (protection from unwanted transient electrical energy coming from the AC power source attached to the battery charger); alarm relays; fuses for overcurrent protection on the AC input and the DC output; power factor correction; configuration of the charger via a digital interface; battery charging algorithms; electromagnetic emission control and immunity; alarm systems with low power consumption latching relays; and/or an LCD battery charger status display. However, many existing battery chargers have no reverse polarity protection, no thermal protection, no alarm relays, no text display, no digital communications interface, no microprocessor, no capability to select twelve volt and twenty-four volt operation in the same charger, no capability to charge a zero volt battery, etc.

Some existing battery chargers use mechanical adjustment devices such as potentiometers, dual in-line package (DIP) switches, pushbuttons, slide switches or other adjustment mechanisms that have a high risk of failure, intermittent functionality, or wear.

Some existing devices' "housekeeping power supplies," which power on-board control circuitry, are only supplied from DC battery power and therefore cannot function if a battery is not connected. As a result, some existing battery chargers may mistake a "zero-volt battery" (a battery which has never been charged or which has been deeply discharged and therefore has very low voltage across its battery terminals) for a short circuit and therefore will not initiate battery charging, and/or may be unable to operate due to lack of housekeeping power from the zero-volt battery.

In addition, certain types of battery applications are subject to regulatory mandates by the National Electric Code, the National Fire Protection Association, and Underwriter's Laboratories regarding when and how the batteries must be charged. Specifically, regulations require lead-acid starting, lighting, and ignition batteries (SLI batteries) that are used to start emergency generators or diesel fire pumps to be continually "float" charged, ensuring that the batteries are fully charged and ready for service at all times. The static battery chargers used to float charge SLI batteries also provide direct current to power accessory loads in the form of equipment such as, for example, electrical switchgear and/or the supervisory systems necessary for the generator or fire pump systems to function.

Traditional continuous float charging involves round-the-clock charging in which the battery charger alternately outputs two charging voltages to the SLI battery to be charged: a "float" voltage and a "boost" fast-recharge voltage. The float voltage is output approximately 99% of the time and is intended to maintain the battery in its fully charged state by replenishing charge at the same rate the battery self-discharges (e.g., up to approximately 13.3 to 13.8 volts for a 12-volt battery). The boost voltage is applied only intermittently and is intended to quickly charge a zero-volt battery that has never been charged or recharge an existing battery that has undergone a discharge event (e.g., approximately 15.5 volts for a 12-volt battery). The boost charge is employed only for the limited duration necessary to fully charge the battery, after which the output voltage from the charger returns to the float voltage pending the next discharge event.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter One embodiment provides a battery-life-extension charging system. The charging system may include (1) a monitoring component configured to measure a direct current (DC) output current delivered by the charging system to a battery, wherein the DC output current is a function of an existing charge status of the battery; (2) a timing component; and (3) a charge control system in communication with the monitoring component and the timing component. The charge control system may be configured for (a) obtaining at least one of a time measurement from the timing component and a charge measurement from the monitoring component; (b) based on the at least one of the time measurement and the charge measurement, determining at least one of a time to complete a charge mode cycle and a charge to complete a charge mode cycle, each tailored to achieve a desired charge status of the battery; and (c) based on the at least one of the time and the charge to complete the charge mode cycle, transitioning to a select one of a number of DC output voltage settings until the time to complete the charge mode cycle has passed or the charge to complete the charge mode cycle has been provided, wherein the DC output voltage settings include at least an eco-float output voltage setting, a refresh output voltage setting, and a boost output voltage setting.

Another embodiment provides a battery-life-extension charging method, which may include (1) obtaining a charge measurement associated with a battery via a monitoring component of a battery charger, the charge measurement reflecting a direct current (DC) output current delivered by the battery charger to the battery; (2) obtaining a time measurement associated with the battery via a timing component of the battery charger; (3) transmitting at least one of the charge measurement and the time measurement to a battery charge control system of the battery charger; (4) determining, by the battery charge control system and based on the at least one of the charge measurement and the time measurement, at least one of a charge to complete a charge mode cycle and a time to complete the charge mode cycle, the charge mode cycle tailored to achieve a desired charge status of the battery; and (5) selectively regulating, by a voltage regulator in communication with the battery charge control system, a DC output voltage of the battery charger to one of a number of pre-set DC output voltages until the time to complete the charge mode cycle has passed or the charge to complete the charge mode cycle has been provided, the pre-set DC output voltages comprising an eco-float output voltage, a refresh output voltage, and a boost output voltage.

Yet another embodiment provides an automatic, self-contained, battery-life-extension charging system. Embodiments of the charging system may include a power printed circuit board (PCB). The power PCB may include (1) input connections to allow an input alternating current (AC) to flow into the charging system; (2) two series-connected switchmode converters that together are configured to convert the input AC into an output direct current (DC) for delivery to a DC load and/or to a parallel-connected battery, to limit the output DC to the DC load, and to regulate a DC output voltage; and (3) monitoring and control circuitry in communication with the two series-connected switchmode converters. The monitoring and control circuitry may include (a) a monitoring component configured to measure a charge measurement associated with the DC load; (b) a timing component configured to measure a time measurement associated with a charge mode cycle of the DC load; and (c) a charge control system in communication with the monitoring component and the timing component, the charge control system configured to transition the two series-connected switchmode converters between a number of DC output voltage charge modes based upon at least one of the charge measurement and the time measurement.

A further embodiment provides a self-contained automatic battery charging system comprising a power printed circuit board (PCB). The power PCB may include input connections to allow an alternating current (AC) power to flow into the self-contained automatic battery charging system, as well as a two-stage switchmode converter implementing two stages that together convert AC into direct current (DC), provide active power factor correction so as to provide an improved power factor, provide electrical isolation between primary and secondary circuitry, regulate output voltage, limit output current of the self-contained automatic battery charging system to a safe value, and provide output connections configured for wiring the DC to an electrical load.

An additional embodiment provides a self-contained automatic battery charging system, comprising (1) a power printed circuit board (PCB); (2) an accessory PCB electrically connected to the power PCB; (3) a controller area network bus (CANbus) interface located upon the power PCB or the accessory PCB; and (4) an NFPA-110-compliant information-sharing interface, wherein (a) implementation of the NFPA-110-compliant information-sharing interface uses information obtained via SAE J1939 standards; and (b) implementation of the NFPA-110-compliant information sharing interface is carried out solely over the CANbus interface without additional hardware and wiring associated with either dedicated meters or alarm relays.

Another embodiment provides a method of charging using a self-contained automatic battery charging system. The method may include (1) inputting an alternating current (AC) power to two series-connected switchmode converters; and (2) via the two series-connected switchmode converters: (a) converting the AC input power into direct current (DC); (b) providing an active power factor correction so as to provide an improved power factor; (c) providing electrical isolation between primary circuitry and secondary circuitry; and (d) regulating an output voltage and limiting an output current to an electrical load.

Other embodiments, and other variations on the above embodiments, are also disclosed.

Additional objects, advantages and novel features of the technology will be set forth in part in the description which follows, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which.

DETAILED DESCRIPTION

Figure 1:
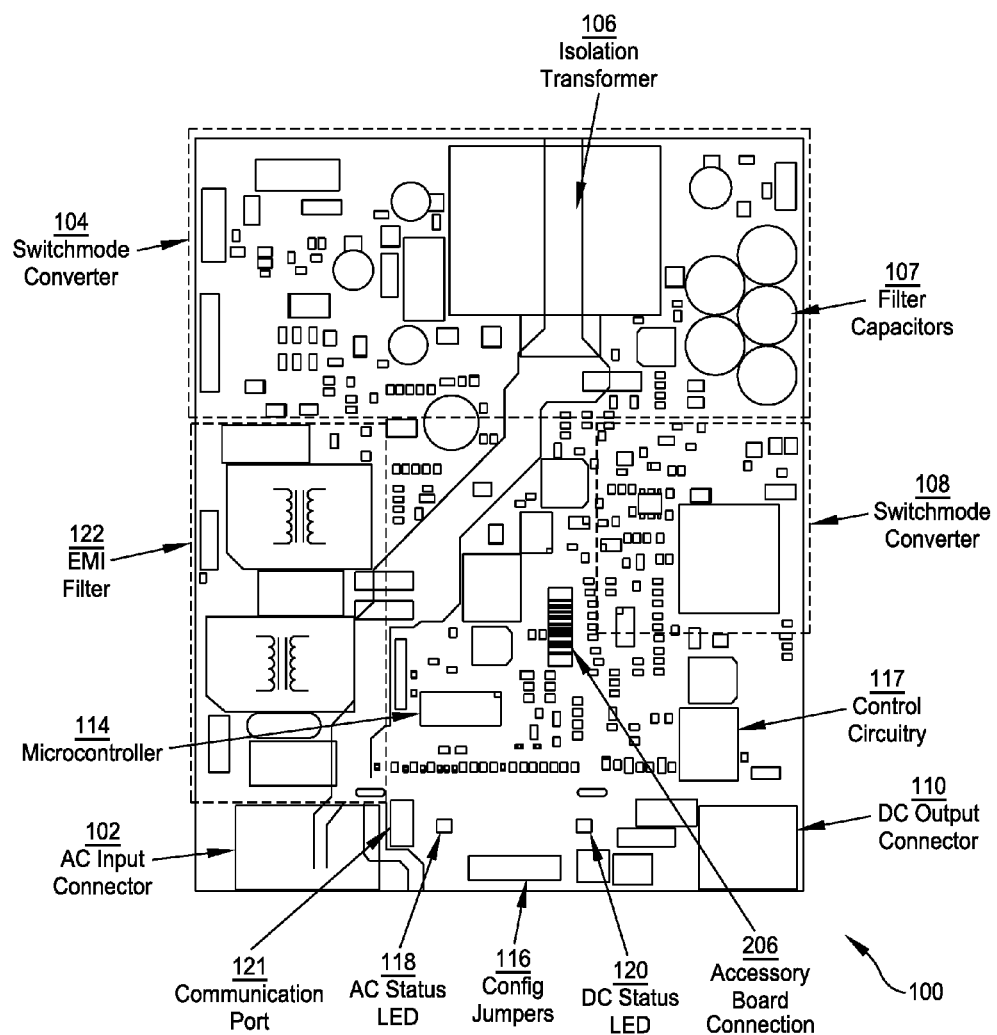
FIG. 1 illustrates a self-contained automatic battery charging system power board layout, according to one embodiment.

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Self-Contained Automatic Battery Charging

In various embodiments, the present self-contained automatic battery charging system performs many functions in addition to the primary function, which is charging an electrical storage battery, or other electrical storage device. There are multiple embodiments of the present self-contained automatic battery charging systems to provide different sets of optional features and functions, based on users' requirements. As discussed in greater detail below, a self-contained automatic battery charging system comprises one or more electronic printed circuit board assemblies, and associated interconnections and components, mounted with fasteners into a metal chassis or enclosure.

The present self-contained automatic battery charging systems are constructed using a printed circuit board (PCB) called the "power board" and an optional printed circuit board assembly called the "accessory board". The essential function of the present self-contained automatic battery charging system is to recharge a storage battery, or other storage device, and then maintain it at a state of charge that is optimized for both peak performance and battery/device lifetime. The battery charger functions as an Alternating Current (AC) to Direct Current (DC) converter, with AC electric power flowing into the battery charger's input circuitry, and DC electric power flowing out of the battery charger's output circuitry. The storage battery may be of the lead acid or nickel cadmium types or of other types or chemistries, may be supplemented with or replaced by an energy storage capacitor, and may consist of one or more cells connected in series or parallel.

In addition to charging a battery, the self-contained automatic battery charging system has many features and may perform many functions including, for example automatic charge initiation and termination, and LED indicators may provide AC status and DC status. As a further example, embodiments may provide active power factor correction, resulting in sinusoidal AC input current in phase with the AC input voltage waveform, which is desirable because it minimizes harmonics on the AC line and minimizes the input volt-amps required to provide adequate input power to operate the device. Also, filtering of outgoing electromagnetic interference (EMI) that can interfere with the operation of other electrical and electronic devices and of incoming EMI that can interfere with the charger's performance may be provided. Example embodiments may provide user-configurable DC output voltage selection for, by way of example, a twelve-volt battery or a twenty-four volt battery, and output voltage modes, by means of either manual jumpers or computer data port. Automatic protection may also be provided against the wrong voltage battery being connected to the device, such as either a twelve-volt battery when configured for twenty-four volt operation, or a twenty-four volt battery when configured for twelve-volt operation. Further, embodiments of the present system may automatically sense and charge a battery, energy storage capacitor or combination thereof from any discharge condition including zero voltage. In accordance with various embodiments, short circuit protection on the output, reverse polarity protection, which may prevent damage to the device when a battery is connected backwards, thermal protection, which may prevent damage when the device is operated in an environment hotter than the charger's rated operating temperature and battery temperature compensation, which incrementally increases output voltage at lower ambient temperatures, and incrementally decreases output voltage at higher ambient temperatures, to adequately charge but not overcharge the battery, may be provided. An optional LCD display and optional relays for alarm outputs may be provided in various embodiments. An optional J1939 compliant CANbus interface, or the like may be provided in accordance with various embodiments to enable two-way communication with the charger.

Hence, embodiments of the self-contained automatic battery charging systems and methods combine active power factor correction, high efficiency and advanced thermal and electrical protection features in a single self-contained device. Various self-contained automatic battery charging system embodiments use different input and output connectors on the same Printed Circuit Board (PCB) utilizing multiple sets of mounting holes. Charger system embodiments can be programmed either manually in discrete increments or programmed in nearly infinite increments via a digital interface. The self-contained automatic battery charging systems may be open-frame or housing-enclosed. Certain embodiments may include a CANbus interface, an accessory board with LCD display, and alarm relays.

Various embodiments of a self-contained automatic battery charging system include an electronic printed circuit board assembly called a power board. AC input circuitry is the first power processing stage, which is a Power Factor Corrected (PFC) converter employing a high-frequency isolation transformer. The output of the converter is applied to a second high frequency switchmode converter, which properly regulates and filters output voltage and limits the output current for application to the battery and optional parallel-connected DC load. A microprocessor-controlled semiconductor switch is placed in the output circuit for reverse polarity protection.

Figure 2:
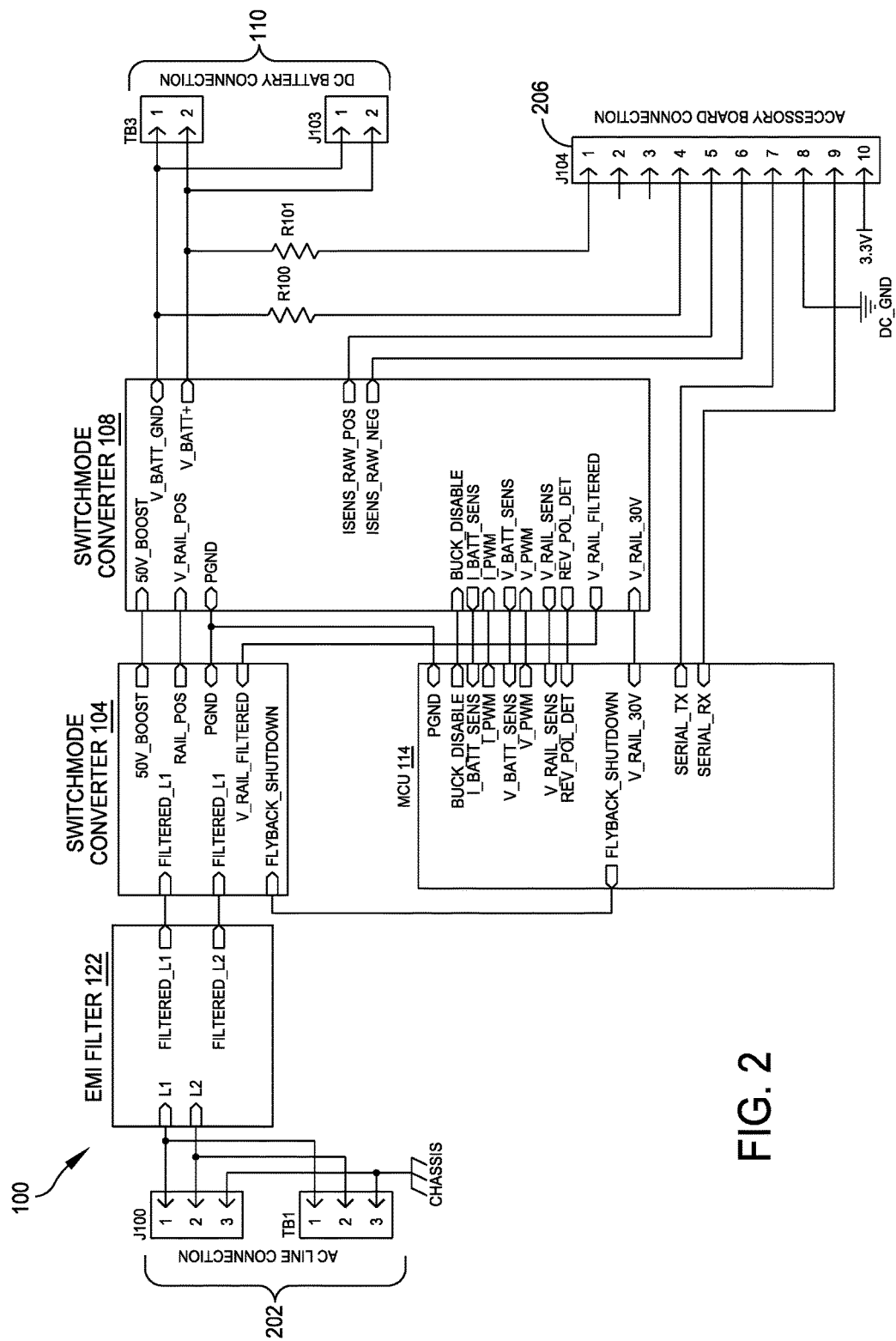
FIG. 2 illustrates a self-contained automatic battery charging system power board block diagram, according to one embodiment.

The power board has many components, each with a specific purpose in enabling operation of the battery charger. FIG. 1 illustrates a layout of self-contained automatic battery charging system power board 100, according to one embodiment, and FIG. 2 is block diagram of self-contained automatic battery charging system power board 100, according to one embodiment. AC input wiring is used to connect an AC power source to input connections 102 of the battery charger to allow AC power to flow into the device. On power board 100, input connector 102 may have a feature (such as on the printed circuit board itself) to allow any one of two or more different configurations of connectors to be installed into holes in the printed circuit board. First high frequency switchmode converter 104 is used to convert the AC input into DC output. Converter 104 uses high frequency isolation transformer 106 to provide electrical isolation between the primary circuitry (AC to DC conversion circuitry of power board 100) and secondary circuitry (control and other feature circuitry of power board 100 and/or of the accessory board discussed below). First switchmode converter 104 may also include filter capacitors 107, and other electrical components.

DC output from the isolation transformer is connected to an input of second high frequency switchmode converter 108, which is used to regulate the output voltage and limit the output current of the battery charger. In one embodiment, second high frequency switchmode converter 108 may function to regulate output voltage in facilitating a battery-life-extension charging system and method or regime, as discussed below in relation of FIGS. 11-13. Output connections 110 are provided on power board 100 for DC output wiring used to connect the battery or other electrical storage device that is to be charged and/or an optional parallel-connected DC load to be powered. In accordance with various embodiments of the self-contained automatic battery charging systems and methods described herein, precision voltage regulation may be enabled by placement of a sense point right at the output terminals, software compensation for voltage drop due to current, and/or the like.

Various embodiments may employ input current inrush limiting to prevent AC fuses from blowing and or circuit breakers from tripping, and may employ a permanently installed DC fuse, which will only open in case of component failure on power board 100.

Various embodiments of the present self-contained automatic battery charging systems and methods may employ active power factor correction. The input AC voltage waveform is sinusoidal. Active circuitry in first high frequency switchmode converter 104 is used in such embodiments to control the amount of electric current flowing into the battery charger's input circuitry such that it is also sinusoidal, and in-phase with the input voltage waveform.

The present multi-stage design (such as the illustrated embodiment two-stage, first-to-second high-frequency switchmode converter design) permits use of effective combinations, and optimization of, characteristics that cannot be accomplished in a single-stage design, such as power factor correction, plus low-ripple, etc. Embodiments of the present systems and methods may: employ single or multi-phase AC input; the electrical power source may be AC, DC or dual AC/DC; and, output may be provided to one or more batteries, different electrical storage devices, and/or one or more non-battery loads.

In various embodiments of the self-contained automatic battery charging systems and methods, various system protections may be built-in on power board 100, such as protection against DC short circuit, reverse DC polarity, and over current. A shorted battery cell can keep charge current at maximum. The resulting chronic overcharge can cause all battery cells to generate significant gas, creating a safety hazard. Hence, if an over current is detected for a long period of time, the system may perform a restart, such as by pausing for a pre-determined time interval, such as, by way of example, five seconds. If that fails, system embodiments may lock-out in a fault mode. This feature has the potential to appropriately disable the charger in case of a shorted battery cell. Such embodiment protections might include reverse polarity protection, provided for power supply and for output voltage sense signals.

Further protections that may be built-in on power board 100 in various embodiments of the self-contained automatic battery charging systems and methods may include load dump (disconnection of battery) protection, wherein the system may become a voltage source and regulate its output to a set of defined voltage levels such as, for example, a float voltage or a boost voltage. With respect to overvoltage, embodiments can, by way of example, withstand up to forty-volt input on DC connections 110. System embodiments may shut down if overvoltage is detected. This may vary with DC output selection. Overvoltage protection may have three features: shutdown is selective, meaning shutdown only occurs if overvoltage is self-induced; the shutdown values differs whether the charger is in twelve-volt versus twenty-four volt mode; and the shutdown value may be set by the charger itself, if the charger sets its output voltage mode automatically.

Thus, in accordance with various embodiments of the present self-contained automatic battery charging systems and methods, the system is digitally controlled with various adjustable set points. The present self-contained battery charging system may eliminate all mechanical switches and potentiometers, because these are more prone to failure than the electronic components such as control circuitry 117, microprocessor 114 and jumpers 116 employed in the present self-contained battery charging system embodiments.

Embodiment protections built into power board 100 with respect to thermal self-protection may include system protection from overheating and reducing output power to allow internal parts to stay within a safe operating range. With respect to loss of AC power, when AC power loss is detected in various embodiments the system power board may lockout for a minimum of, by way of example, five seconds before returning to idle, then it may restart automatic boost charge or go into float charge mode.

Embodiments of the self-contained automatic battery charging systems and methods may make use of combinations of latching and non-latching relays to achieve proper behavior in all conditions, including no-power conditions and to minimize power consumption. Components may be highly integrated (such as on a single Printed Circuit Assembly (PCA) and/or within a single enclosure) or distributed (such as on multiple PCAs, and/or in multiple enclosures, separated by distance), each providing advantages for specific applications.

Figure 3:
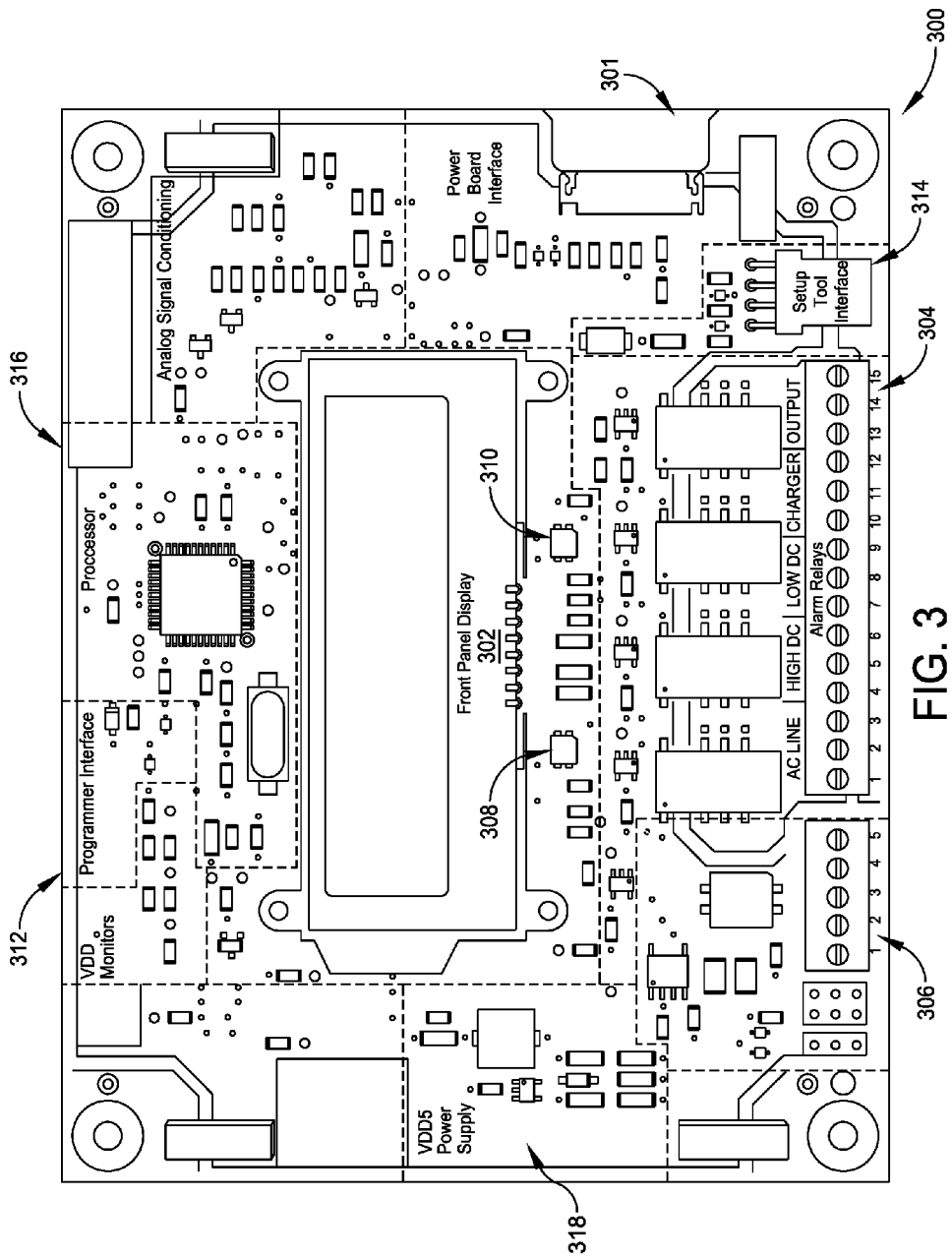
FIG. 3 illustrates a self-contained automatic battery charging system accessory board layout, according to one embodiment.
Figure 4:
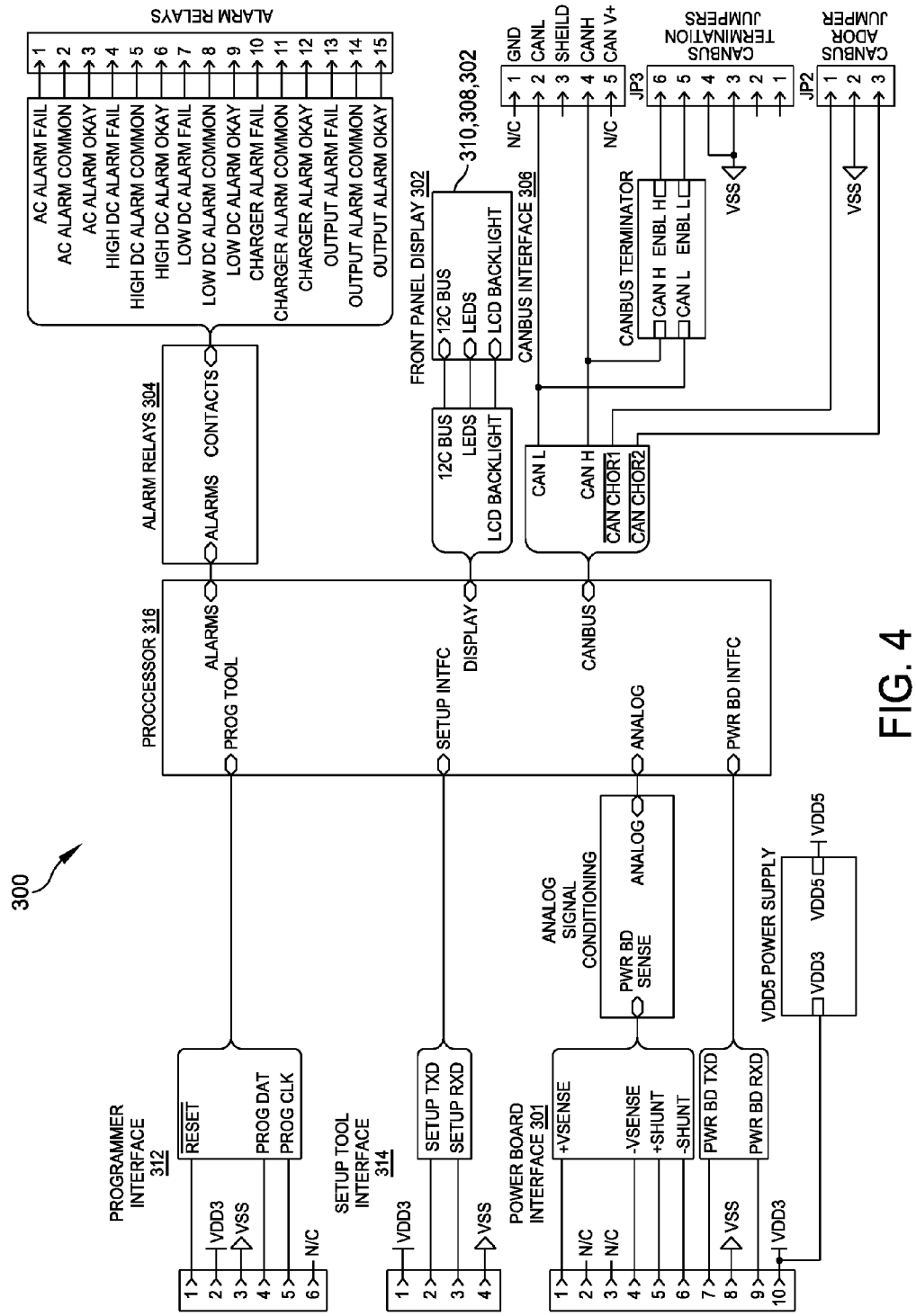
FIG. 4 illustrates a self-contained automatic battery charging system accessory board block diagram, according to one embodiment.

Hence, various embodiments of a self-contained automatic battery charging system may also contain another electronic printed circuit board assembly referred to herein as an accessory board, which is electrically connected to power board 100, via accessory board connector 206 and is housed in a same chassis or enclosure, along with the power board, as discussed in greater detail below. FIG. 3 illustrates layout of self-contained automatic battery charging system accessory board 300, according to one embodiment, and FIG. 4 is a block diagram of self-contained automatic battery charging system accessory board 300, according to one embodiment. Accessory board 300 may be electrically connected to power board 100 via power board connector and associated interface 301. Additional features and functions in a self-contained automatic battery charging system that contains accessory board 300 might, in accordance with various embodiments, include LCD display 302, one or more alarm output relays 304, and/or a CANbus interface 306. The accessory board also may also have LED status indicators 308 and 310 that can be used to either duplicate the function of LEDs 118 and 120 located on power board 100 or deliver different functions.

In one embodiment, in the event of low battery voltage and/or short circuit the system embodiments may charge the battery at a low current (for example 0.75 A to 1 A) until the battery reaches a threshold voltage (for example 5 VDC), at which point the current will be increased to the maximum allowed current. At a regular interval (for example every 15 seconds) the charger may deliver more current, so that a resistive load or other load would show an increased voltage. As a safety measure, the charger may shut down and lock off after five minutes of operation (or a different pre-determined time interval) if DC voltage does not exceed a pre-determined safe value. When this happens LCD-equipped chargers display "Low battery voltage," "Charger fail" and/or the like on an alarm display screen. This shutdown prevents long-term overcharge of the battery in case of mismatched battery voltage and charger voltage settings. A charger that is locked out due to battery mismatch can, in accordance with various embodiments of the present systems and methods, be reset manually.

In accordance with various embodiments, the present self-contained automatic battery charging systems and methods may detect a mismatch when the charger is set for a twenty-four volt battery and is connected to a twelve-volt battery. In such a case, the charger may shut down and lock off after a pre-determined time interval of operation (such as five minutes) if DC voltage does not exceed a pre-determined value within the normal operating range for a twenty-four volt battery. When this happens LCD-equipped chargers may display "Low battery voltage," "Charger fail," and/or the like on the alarm display screen. This shutdown prevents long-term overcharge of, for example, a twelve-volt battery in case of mismatched battery and charger settings. Again, a charger that is locked out due to battery mismatch may be reset manually. This may be done by removing and replacing any one of a number of charger adjustment jumpers 116 on power board 100.

In accordance with various embodiments, the present self-contained automatic battery charging systems and methods may detect a mismatch when a charger set for a twelve-volt battery is connected to a twenty-four volt battery. When a charger set for twelve-volt output detects a battery higher than a predetermined voltage, such as by way of example eighteen volts, the charger shuts down and locks off. When this happens LCD-equipped chargers will display "High battery voltage," "Charger fail," or the like on the alarm display screen. The charger may be restarted manually, such as by removing and replacing any one of the charger adjustment jumpers.

Calibration of the present systems may be carried out using hardware and/or software. Software-only calibration may have certain advantages. Software calibration may allow for automation during production, eliminate reliability issues of potentiometers, and/or the like. In accordance with various embodiments software parameters may be arranged in non-volatile memory, including both protected (e.g. serial number, calibration) and non-protected (e.g. output voltage) values. Embodiments of the self-contained automatic battery charging systems may be dual-configurable, i.e. software, jumper or combination configurable. Software messages for LCD display 302 may be configurable for multiple languages. LED messages may be coded using color, on/off duration, pulse control (including pulse count), intensity or combinations thereof to provide a compact, low-cost, high-reliability user interface, in accordance with various embodiments. Redundant LEDs can be disabled to conserve power.

Embodiments of the self-contained automatic battery charging systems and methods include an ability to communicate for setup and configuration, which may be over power board communication port 121 or a separate accessory board communication port 314. In some embodiments such communication may use proprietary implementations, so as to prevent unintended access to critical parameters. The communication port(s) may use any interface method (wired, wireless radio, infrared/optical, inductive) and any format/protocol. Some embodiments may specifically use a wired serial port with proprietary binary protocol for low-cost/simplicity.

A setup/configuration program may be provided to communicate with the charger, and it may be considered part of various embodiments of the overall system. The program might be run on any suitable device such as a smart phone, a general-purpose computer, or a special-purpose computing device. The program allows a user to set parameters, one at a time, in groups or in a single all-inclusive set. The user may save configuration parameters in a file for later re-use or editing. This permits easy mass commissioning or retrofit of chargers with identical parameters. The program allows a user to field-upgrade charger firmware. Capability may be provided in various embodiments to load pre-defined battery-specific files containing data on battery attributes and other parameters. In accordance with various embodiments incremental improvements or adjustments to the performance of the present self-contained automatic battery charging systems may be made by revising the firmware, without making any changes to the hardware. Such changes in the behavior or performance of the battery charger may be associated with performance, efficiency and protection functions.

Also, in accordance with various embodiments of the present systems and methods, charging mode selection may allow selection of either battery charging mode or ultracapacitor and/or supercapacitor charging mode. Thereby, a capability may be provided in various embodiments to load pre-defined ultracapacitor and/or supercapacitor specific files containing data on specific ultracapacitor and/or supercapacitor model attributes and other parameters. In ultracapacitor and/or supercapacitor mode, different control rules and protective systems and methods may enable the charger to operate safely for long periods at voltages well below the nominal voltage of the storage device being charged In various embodiments, a software communication library that is application-independent underlies setup/configuration communications. In some implementations this is a dynamically linked library (e.g. .dll or other data item) for easy application integration and updates. Such a standardized communication library can be used in conjunction with more than one model of charger and with more than one software application. Such a common code base reduces development and maintenance effort.

Embodiments of the device may implement SAE J1939, such as on accessory board 300, or elsewhere. CANbus is an electrical specification for an interface and J1939 is a specific implementation of a communication protocol. Embodiments optionally implement not only those functions required by SAE J1939, but also charger-specific functions permitted by, but not defined in, J1939. Embodiment definitions for charger-specific functions which, among other things, permit a user of the charger to implement NFPA-110-compliant interface 306 using information obtained via J1939 without the additional hardware cost and wiring associated with dedicated meters and alarm relays in prior implementations. Various embodiments of the self-contained automatic battery charging systems and methods may support communication protocols other than SAE J1939, such as Modbus ASCII, Modbus RTU, Modbus TCP/IP, etc.

Correspondingly, various embodiments of the self-contained automatic battery charging systems and methods may support interfaces other than CAN, such as RS485, Ethernet 10-base-T, Ethernet 100-base-T, etc.

For temperature sensing, embodiments of the device have the capability to use one or more sensors, and the ability to manage using local or remote sensors, communicating via J1939 CANbus interface 306, or the like.

With respect to customer connected logic and power signals, these may be filtered in certain embodiments. Logic signals attached to any connector or configuration header may have an ESD protection device. Embodiment CANbus signals may have a jumper-selected termination network. The terminator may use split resistance with a bypass capacitor to the common reference, providing both differential-mode termination for CAN data and common-mode termination to improve EMI rejection. Unlike existing chargers, the CANbus termination is easily disconnected for installations in the middle of the bus, or where an external terminator already exists, situations that occur often. A CAN Charger Select configuration jumper, in embodiments, selects the J1939 charger function, which may be either BCH1 (charger for "main" battery") or BCH2 (charger for "auxiliary" battery). If no jumper is present the default action may be to disable the CANbus interface, but OEMs (Original Equipment Manufacturers) can select BCH1 or BCH2 as the default (for "jumperless" operation, similar to the power board).

Embodiment accessory board processor 316 may include program ROM, data RAM, data EEPROM, multi-channel analog to digital converter, CANbus controller, dual serial ports (UARTS, used for power board and setup tool interfaces), $I^2C$ controller (used for LCD control), several timers, and system clock function. The processor clock may be set by a crystal to meet J1939 tolerance requirements. Processor outputs may use pull-up or pull-down resistors to hold the signals in their inactive state during power-on reset and while the processor initializes the I/O ports. The illustrated embodiment CANbus transceiver may use five-volt power supply 318 to meet the CAN specifications. Power supply 318 may include a boost converter that raises the 3.3V power supply to 5.0V, for use by the CANbus transceiver, alarm relays, and the LCD backlight LEDs. When the CAN bus is not used, the transceiver can be disabled to reduce power-off battery drain. The CANbus interface operates at 250 KBaud, the standard J1939 data rate. Alternate CANbus data rates (62.5K, 125K, 500K or 1 MBaud) are within the interface's electrical capability, and can be selected, such as by custom setup using the setup tool, in embodiments where software is capable of maintaining such data rates.

The embodiments shown in FIGS. 3 and 4 may use four alarm relays 304, with each relay providing one form "C" contact set for its alarm condition. In addition to the individual contacts, a second set of contacts on two of the relays may be, as illustrated, wired to provide an "Output" alarm, providing, by way of example, a single alarm contact function that may be used for emergency power supply systems, fire pump charger applications, and the like. These contacts may be in a "FAIL" state when the charger output malfunctions for any reason, and in an "OK" state when the charger is operating normally. To minimize power-off battery drain in various embodiments, three of the relays may be latching relays, so they do not require continuous coil power. One relay may be non-latching so that it switches to FAIL when power is absent; it is also commanded to the FAIL state when AC failure occurs, so that its coil power will not increase power-off battery drain.

In the embodiments shown in FIGS. 3 and 4, the front panel display, the primary display, may be a character-mode LCD (302). This display uses an $I^2C$ serial interface, reducing the number of IO (Input/Output) lines dedicated to the display. The display has a hardware-reset signal driven by the processor. There is a pull-down resistor to hold the display in reset until the processor asserts control over the signal. This assures the display remains "clean" during power-on and power-off transitions. Various embodiment displays have a white LED back-light. The backlight may be switched under processor control. Embodiment displays also have two multi-color LEDs, duplicating the function of (an) LED(s) on power board 100 and/or that deliver functions in addition to those provided by LEDs located on power board 100.

The embodiments shown in FIGS. 3 and 4 may employ analog signal conditioning, both analog sense channels from power board 100, SHUNT and VSENSE, have a differential buffer amplifier to scale the ADC sense signal and to reduce the effect of DC offset voltage between accessory board 300 and power board 100. In addition to these two signals from power board 100, to be shown on display 302 and reported via the CANbus, there are voltage dividers for accessory board power supplies, in various embodiments. The ADC readings from these channels are used for self-test of the accessory board. If both readings are within their expected range, the system can confirm that the power supply, reference voltage generator and the processor's ADC are functioning properly.

Embodiments of the present self-contained automatic battery charging systems are capable of charging a "zero volt battery". The term "zero volt battery" refers to a battery which has been deeply discharged and therefore the voltage across the battery terminals is very low, and can be described as being nearly "zero volts". Unless a battery charger is specifically designed to detect and charge a zero volt battery, the battery charger may not function for several reasons, possibly including because the charger derives its control power only from battery voltage, or because the charger mistakes the zero volt battery for a short circuit and does not start as a safety measure. Embodiments of the present self-contained automatic battery charging systems are capable of operating their "housekeeping supply" either from battery power or from AC input power. Existing devices typically are operated only from DC battery power and therefore cannot function if the DC battery is not connected and/or when connected to a zero volt battery.

Embodiments of the present systems and methods may meet multiple regulatory standards in multiple jurisdictions, UL, C/UL, CE, IBC, NFPA, OSHPD, California efficiency, and/or the like. For California efficiency, embodiments of the present systems and methods may implement adaptive control to comply, are able to track time history of energy consumption to meet time-based requirements, and/or the like. Embodiments of the present self-contained automatic battery charging systems work with ungrounded, negative grounded, or positive grounded DC systems.

Figure 5:
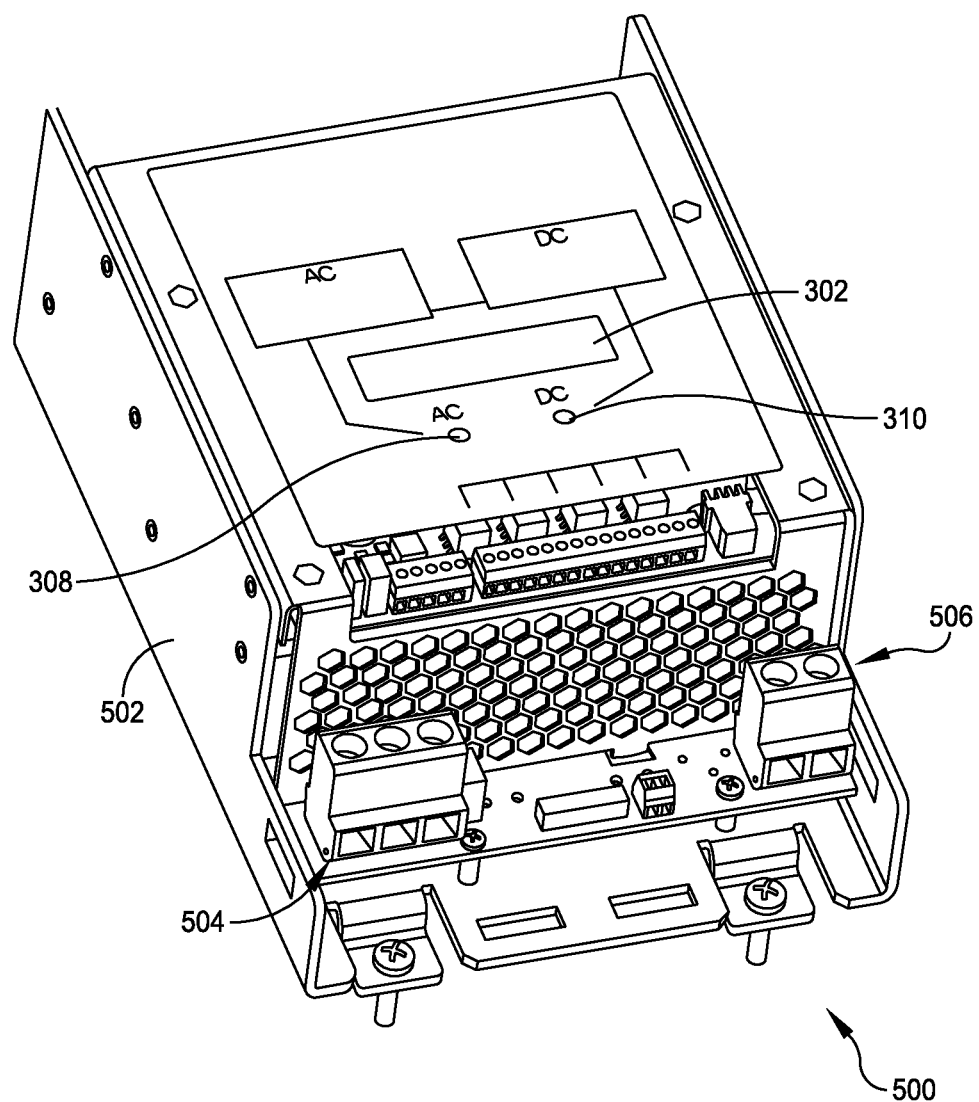
FIG. 5 illustrates a front perspective view of a self-contained automatic battery charging system utilizing a combination chassis and heat sink, according to one embodiment.
Figure 6:
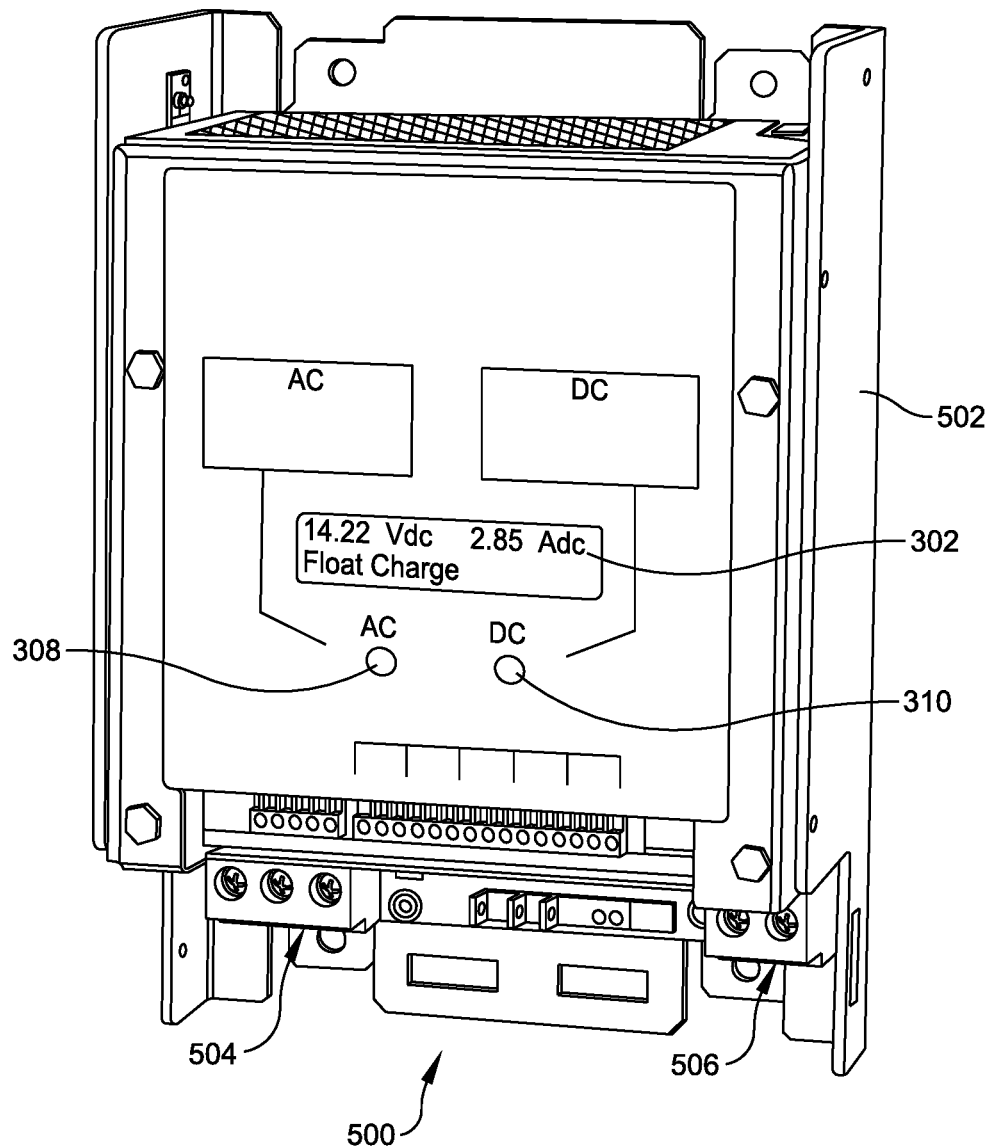
FIG. 6 illustrates another front perspective view of a self-contained automatic battery charging system utilizing a combination chassis and heat sink, according to one embodiment.

FIGS. 5 and 6 illustrate front perspective views of one embodiment of a self-contained automatic battery charging system 500 utilizing a combination chassis and heat sink 502, according to some embodiments. Embodiments of the present self-contained automatic battery charging system 500 utilizes a combination chassis and heat sink design such that aluminum chassis 502 may provide both structural mounting for end user electrical connections 504 and 506, an end user and agency compliant safety enclosure, and the surface area needed for thermal dissipation through natural convection cooling. Thermal output from electrical components is dissipated through conduction directly into the chassis walls 502, while the components are kept electrically isolated using a high dielectric and low thermal resistance film interface. In accordance with various embodiments, the combination chassis/heat sink eliminates need to cool the power components individually with forced air fan cooling, or the like.

As noted, embodiments of a self-contained battery charging system may or may not include an accessory board, and may or may not include an enclosure for outdoor use. Thus one "minimum" embodiment of the present self-contained automatic battery charging system comprises only a power board, mounted in a chassis (for indoor, or otherwise protected, use).

Figure 7:
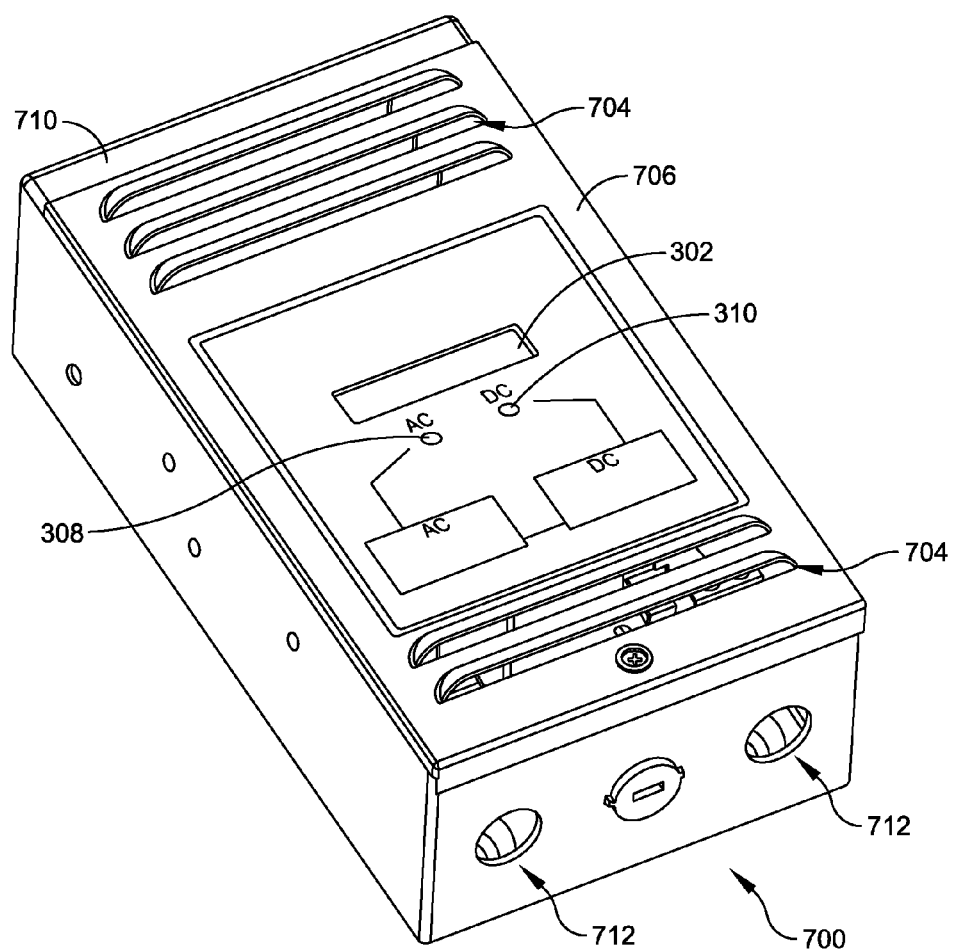
FIG. 7 illustrates a front perspective view of a self-contained automatic battery charging system having a weatherproof enclosure, according to one embodiment.
Figure 8:
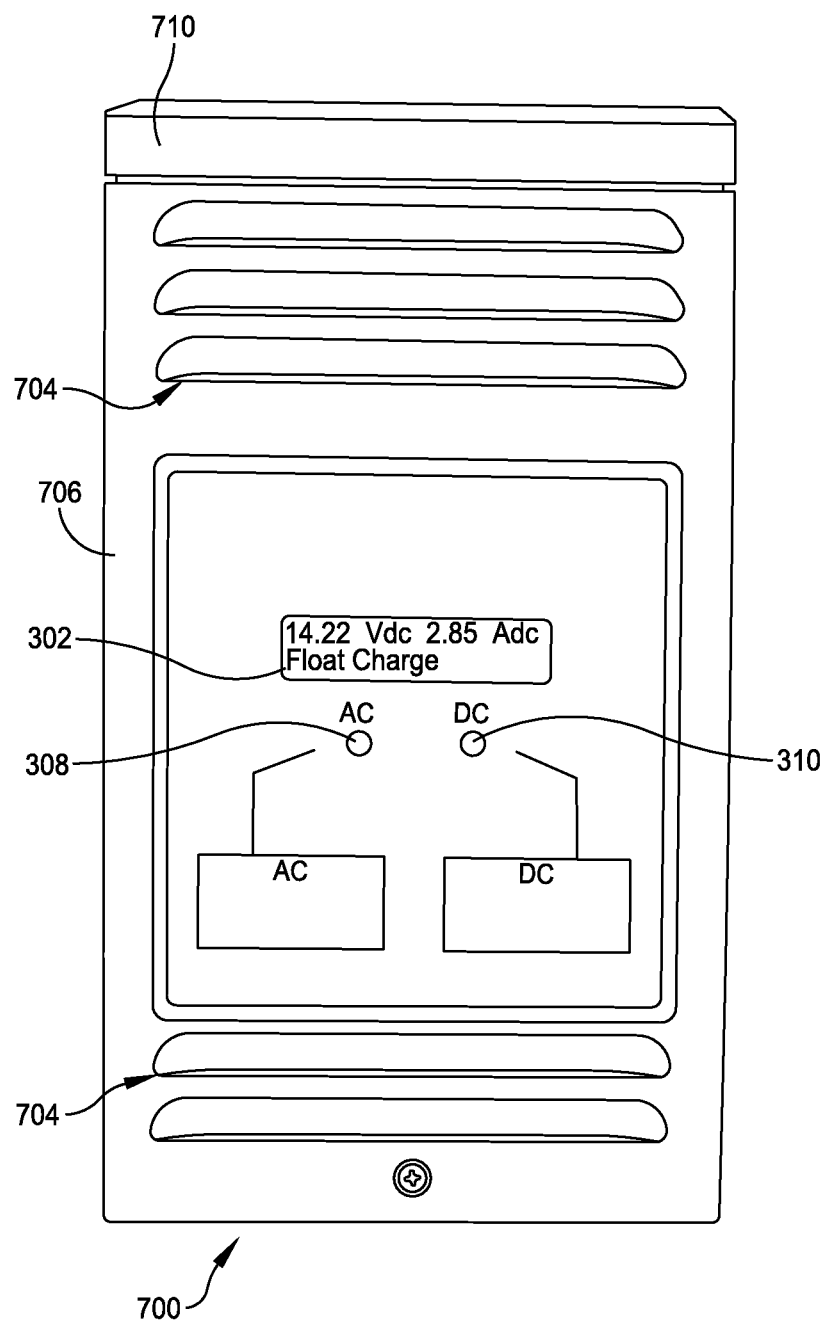
FIG. 8 is a front view of a self-contained automatic battery charging system having a weatherproof enclosure, according to one embodiment.

However, some embodiments may have a weather-resistant enclosure. FIGS. 7 and 8 illustrate respective perspective and front views of self-contained automatic battery charging system 700 having weather-resistant enclosure. In various embodiments enclosure is vented (704), yet provides for a high degree of protection from water ingress by virtue of the location and orientation of vents 704 and use of a rear mounting surface to prevent direct ingress of water or particles. Thus, enclosure provides a high degree of protection from water ingress without the use of gaskets or seals on removable cover 706. This is accomplished by the profile shape of the cover as it mates with base enclosure and overhang 710 of the top of the enclosure. The enclosure provides a minimum footprint by virtue of the location of bottom-entry wiring openings 712 and inboard location of mounting holes.

A local Remote Temperature Sensing (RTS) sensor may be located, such as by way of example, at incoming air vent 704 to minimize effects of self-heating, in accordance with various embodiments of the present self-contained automatic battery charging systems and methods. Remote temperature compensation may be provided by the remote sensor, through connection to a temperature compensation port on power board 100 and/or accessory board 300. Automatic protection of the temperature compensation system from going to out-of-range values due to shorted or open sensor may also be a feature of various embodiments. Additionally, embodiments of the self-contained automatic battery charging systems may have fault-tolerant (for shorts or opens) remote temperature sensor input. An alarm summary output may be provided by an internal connection scheme that eliminates the need for a separate summary relay or external user wiring and logic.

Figure 9:
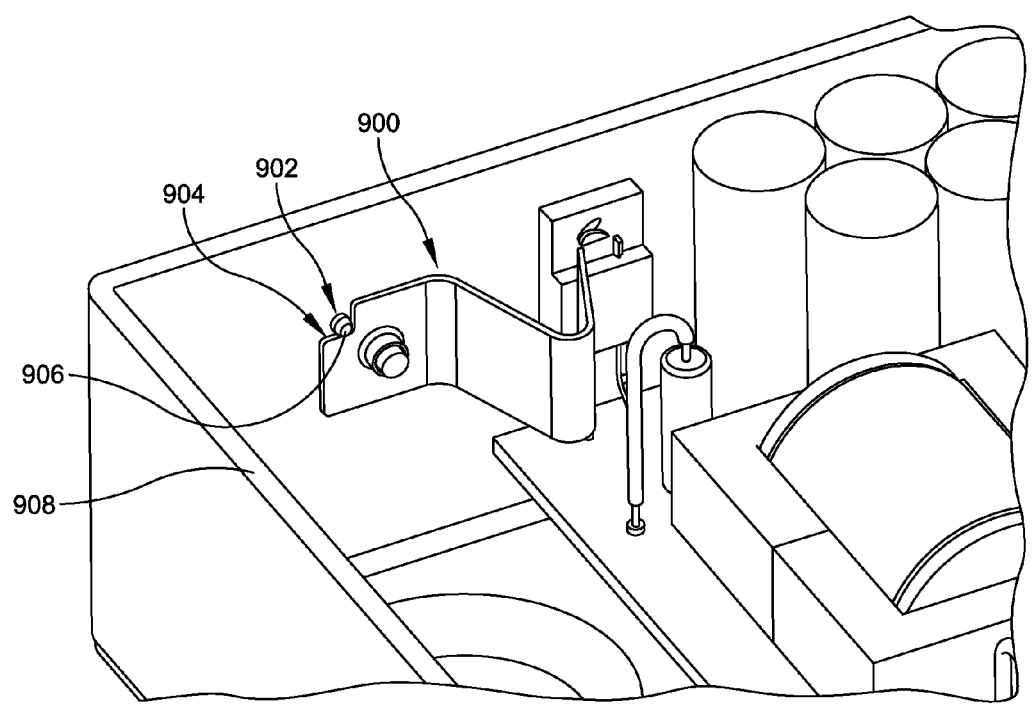
FIG. 9 illustrates a fragmented view of a portion of a self-contained automatic battery charging system showing a single heat sink clip suitable for use with a variety of component package sizes and having an anti-rotation feature, according to one embodiment.
Figure 10:
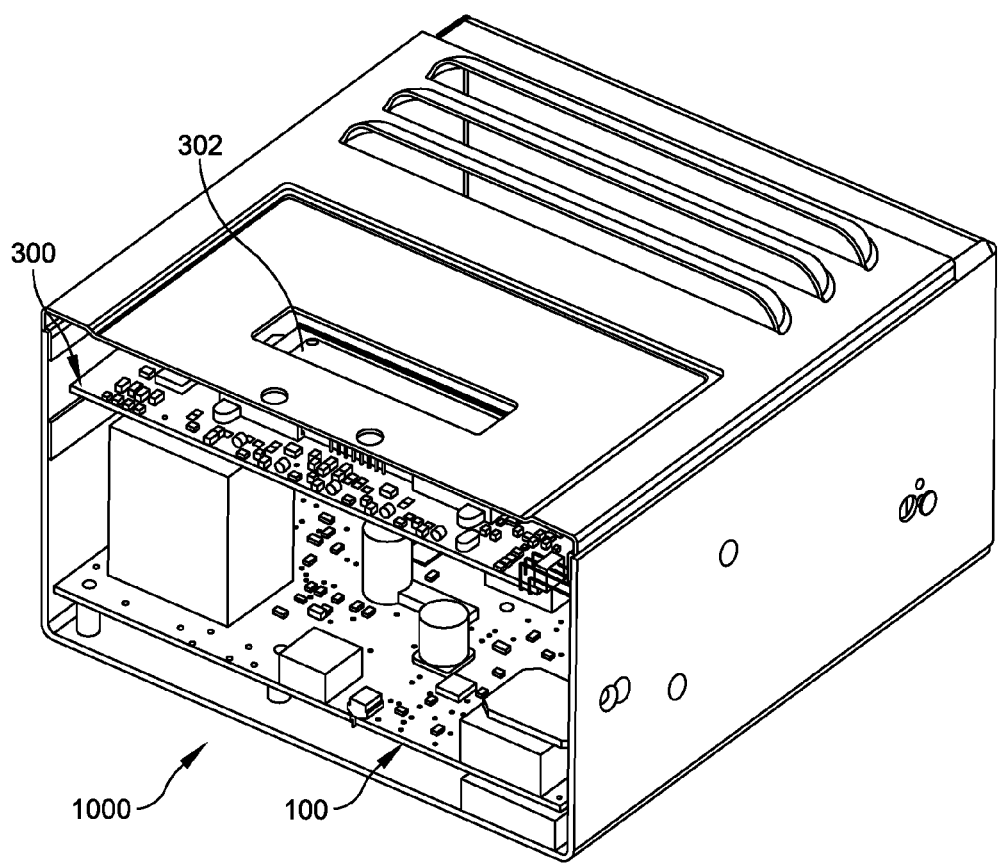
FIG. 10 is a generally cross-sectional, fragmented view of a self-contained automatic battery charging system, according to one embodiment.

FIG. 9 illustrates an embodiment of heat sink clip 900, which includes anti-rotation element 902 to speed assembly and reduce production costs. Clip 900 is designed so that a single clip design can clamp a variety of electronic packages, thus eliminating the need for multiple clip types and reducing production costs. In accordance with various embodiments of the present systems and methods, anti-rotation element 902 comprises cut-out corner 904, and peg 906, or the like, pressed into chassis 908. Clips 900 may facilitate mounting of main power board 100 as shown in FIG. 10, which is a generally cross-sectional, fragmented view of self-contained automatic battery charging system 1000, according to one embodiment.

Regardless of whether an employed embodiment of the present charger is chassis-mounted our mounted in an enclosure, during installation, a self-contained battery charging system may be mounted on a flat vertical surface such as a wall, or a panel, bracket or the like on machinery, such as a generator set. The charger may be mounted using fasteners such as screws or bolts. With electric power turned off, AC input wiring is attached to the AC input terminal block or connector. Without a battery connected, DC output wiring is attached to the DC output terminal block. The user selects and places the configuration jumpers in the correct jumper positions. A battery of the correct type, voltage, and polarity is connected. AC power is turned on and the user verifies correct operation of the battery charger. If the optional accessory board is present, the user may also connect a CANbus interface cable and individual wires to the alarm relay outputs as required for the application.

In accordance with various embodiments many different components or substitute parts can be used in the present self-contained automatic battery charging systems. Transformers from different manufacturers, Field Effect Transistors (FETs), capacitors, resistors, integrated circuits, diodes, inductors, and other discrete board-mounted electronic components may be "second sourced" or substituted. Embodiments of the present self-contained automatic battery charging systems may contain many critical components, for electrical performance, mechanical performance, thermal management, and proper operation of the firmware and digital interfaces. Typical materials used in commercial electronic products are used in the self-contained battery charging system; include copper, aluminum, steel, plastics, dielectric materials, semiconductor materials, etc.

Embodiments of the present self-contained battery charging system could be used as a power supply, such as with no battery connected. In such embodiments, functions such as precision voltage regulation, alarm circuitry, reverse polarity protection and other protective systems might not necessarily be needed, but they would not interfere with normal operation of the unit if employed as a power supply without a battery.

If the accessory board is not included the resulting self-contained automatic battery charging system embodiments are capable of charging a battery, however, some features may not be present such as alarm relay outputs, LCD display, and the like. Hence, in accordance with various embodiments certain functions of a self-contained automatic battery charging system may be eliminated such as active power factor correction, zero volt battery charging, temperature compensation, reverse polarity protection, thermal protection, and/or surge protection, separate from and without taking away from other remaining features. Further alternative embodiments might always operate only at twelve volts or only at twenty-four volts and not be user selectable between twelve-volt or twenty-four volt operation.

Battery-Life-Extension Charging

When flooded lead-acid starting, lighting, and ignition batteries (SLI batteries) are continuously float charged as required by emergency generator and diesel fire pump regulations, as discussed above in the Background section, the duration of battery charging (i.e., round-the-clock battery charging) greatly exceeds the short daily charging time anticipated by SLI battery designers. That is, SLI batteries are optimized for their most common applications, which generally involve delivering high current to start cars, trucks, off-road vehicles, and other mobile and/or heavy equipment. In these common applications, the SLI batteries are only charged when the machine's engine is running, which typically lasts only a fraction of each day. In these circumstances, the materials composing the SLI batteries tend to fail in a gradual manner at the same rate, and nearly all components of the battery tend to fail around the same time.

Vehicle charging systems typically recharge the SLI battery by employing a belt-driven alternator, which runs a few hours each day when the vehicle/machine is in operation. Although this is the charging scheme for which SLI batteries are designed, the intermittent, alternator approach is not effective in emergency generator or diesel fire pump applications. First, regulations mandate that emergency generator and fire pump SLI batteries be recharged quickly after complete discharge. This requires a high "boost" voltage, discussed above, that is higher than that available from vehicle alternators. Second, various regulatory bodies require that SLI batteries used in these applications be charged at all times using a "float" charging regime. A charging scheme that emulates vehicle charging would shut down the battery charger for much of the time, therefore allowing the battery to lose charge and violating regulatory requirements. Third, some emergency generators employ DC-powered auxiliary equipment that draws DC power from the battery constantly, and these power needs would not be met with intermittent charging.

While intermittent charging is insufficient for SLI batteries employed in emergency generator and/or diesel fire pump applications, around-the-clock charging, such as the continuous float charging required for such batteries, is also inadequate. Specifically, continuous float charging considerably shortens the life of the separator materials commonly used in flooded lead-acid SLI batteries to a shorter interval than battery designers intended and a shorter interval than the life of the other materials in the battery.

By way of explanation, battery separators separate the positive and negative electrodes of a battery's galvanic cell. The separator must serve over a long period of time to physically separate the electrodes without excessive hindrance to ionic current flows. In the hostile environment of a lead-acid battery, which exposes the separator to sulfuric acid and strong oxidizing species such as lead dioxide or nascent oxygen, only a few substances are stable over the expected life of the battery. These substances include primarily silica, glass fibers, a few salts, and a few synthetics. Polyethylene is generally the selected material in most flooded lead-acid SLI batteries. All organic separator materials, including polyethylene, will decompose and, via several intermediate steps, oxidize to carbon dioxide and water over time. This oxidation leads to separator failure.

The amount of electric charge output to the battery, and in particular overcharge, accelerates the oxidation process, and thus accelerates failure of the battery separator. As a result, the continuous float charging mandated for SLI batteries powering emergency generators and diesel fire pumps leads to greatly accelerated separator oxidation (e.g., polyethylene oxidation), causing the SLI battery separator to fail long before other battery components and the entire battery to fail significantly sooner than SLI batteries employed in the more common applications, such as starting vehicle and heavy machinery engines, which are subject to the intermittent charging for which they were designed.

In addition to a shorter useful life, separator failure is sometimes catastrophic because failed separators enable short circuits between the positive and negative electrodes. A large short-circuit current flowing between electrodes may lead to battery explosion and subsequent release into the environment of flammable hydrogen gas, corrosive sulfuric acid electrolyte, and toxic lead metal and lead-bearing compounds.

Thus, there exists a need for battery-life-extension charging systems and methods that fulfill the regulatory requirements mandating continuous charging of SLI batteries employed in emergency generator and/or diesel fire pump applications, and that reduce the rate at which polyethylene and other organic separators suffer oxidation degradation, thereby extending separator life to meet or exceed the life of the remaining SLI battery components and reducing the frequency of premature and catastrophic battery failures. Embodiments of the present battery-life-extension charging systems and methods mitigate the life-reducing effect on lead-acid SLI batteries that is caused by continuous "float" battery charging, and also provide the ability to continuously maintain the battery in a fully charged state, and able to power auxiliary loads connected to the battery. As will be explained below, the systems and methods disclosed herein also reduce the overall amount of continuous current the battery charger sends to the battery, thus reducing the long-term electrical power consumption of the battery charger and, as a result, reducing operating expenses.

Figure 11:
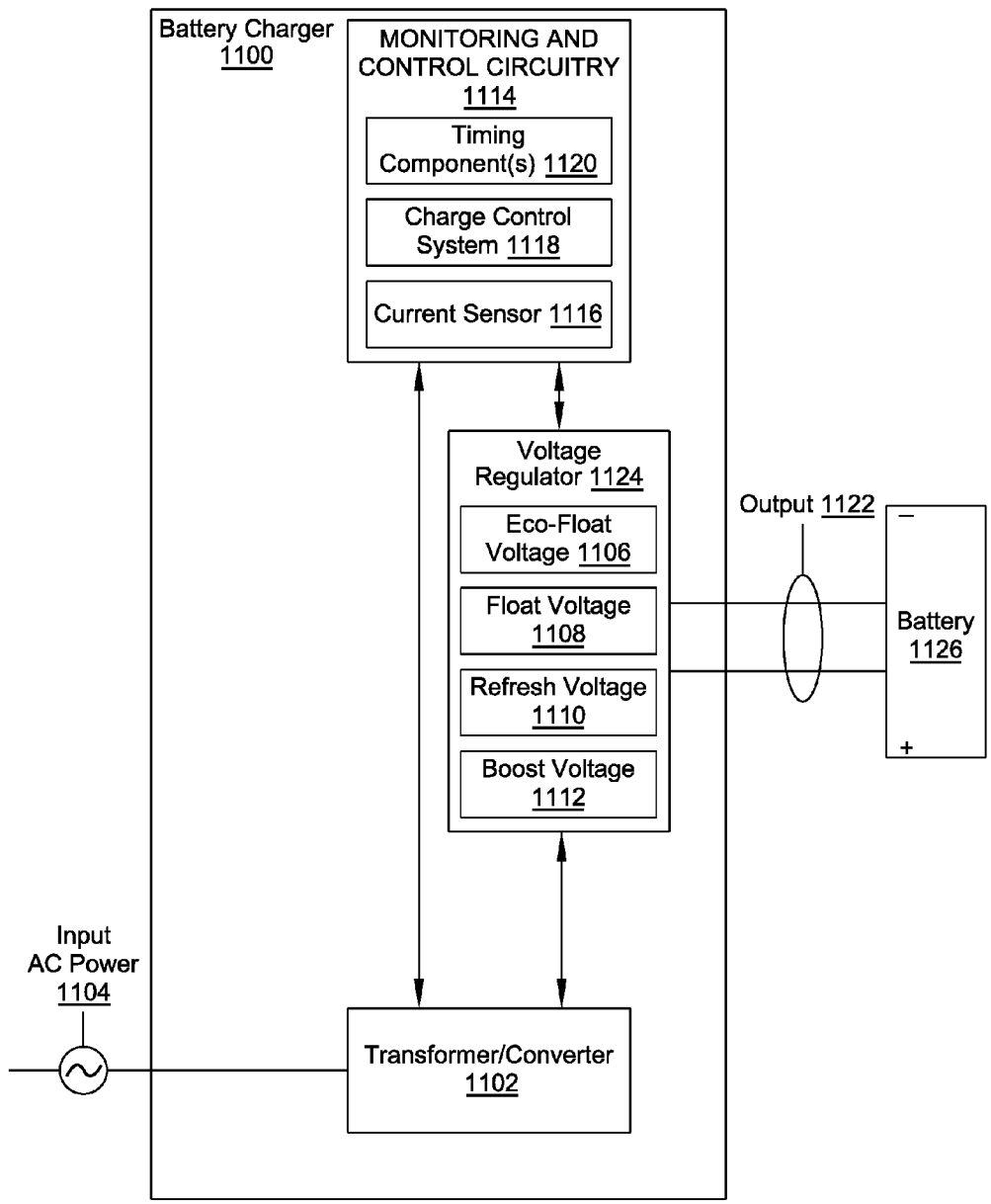
FIG. 11 illustrates a functional schematic of one embodiment of a battery-life-extension charging system.

FIG. 11 illustrates a functional block diagram of one embodiment of a battery-life-extension charger 1100. In this embodiment, charger 1100 may receive AC input current/power 1104 from any appropriate AC power source. AC input current 1104 may be converted to DC current/power using a transformer/converter 1102 and related circuitry (e.g., switchmode converters 104, 108 of FIG. 1). Charger 1100 may also include monitoring and control circuitry 1114, which may incorporate a current sensor 1116, a charge control system 1118, and a timing component 1120, such as a timer or timers, a clock or clocks, our one or more counters. In this embodiment, charge control system 1118 may include one or more microprocessors, microcontrollers, Application Specific Integrated Circuits (ASICs), and/or the like.

Depending on its state of charge, a battery will accept more or less current from a battery charger that is producing a regulated preset DC output voltage. Thus, for a battery charger that is operating at a set output voltage, a battery will typically draw more current when it is in a discharged state as compared to the current it will draw in a fully-charged state at that constant output voltage. Regardless of the battery's state of charge, the battery will typically draw more current when the battery charger is set to a higher output voltage as compared to when the battery charger is set to a lower output voltage. With this relationship in mind, current sensor 1116 may be configured to measure a DC output current/power 1122 being delivered by charger 1100 to a DC load, which, in this embodiment, may be a flooded lead-acid SLI battery 1126, another electronic device requiring charging, and/or a DC auxiliary load (e.g., DC-powered auxiliary equipment that draws constant DC power from the battery). Current sensor 1116 may provide charge measurements in the form of DC output current/power data (i.e., the current/power that is drawn or demanded by the battery) to charge control system 1118. Timing component 1120 may similarly provide time measurements/timing data to charge control system 1118, which may, in turn, use the charge measurements and time measurements transmitted from current sensor 1116 and timing component 1120, respectively, as components of a feedback loop used to regulate the DC output voltage via a voltage regulator 1124.

In this regard, charge control system 1118 may employ the present battery-life-extension methods to provide at least four pre-set DC output voltage settings, which regulate the charge delivered to the battery/DC load by regulating the voltage difference between the charger and the battery, thereby impacting the DC output current/power 1122 delivered to the battery/DC load. In one embodiment, the four pre-set output voltage settings may include an eco-float output voltage 1106 ($V_{EF}$), a float output voltage 1108 ($V_F$), a refresh output voltage 1110 ($V_R$), and a boost output voltage 1112 ($V_B$).

Float voltage 1108 may be an output voltage sufficient to maintain the battery in its fully charged state by replenishing charge at the same rate the battery self-discharges (e.g., 13.3 to 13.8 volts for a 12-volt battery). As discussed above, while continuous float charging is commonly employed to no ill effect with stationary batteries designed for continuous float charging, continuous float charging causes damage to the polyethylene separators employed in most flooded lead-acid SLI batteries.

Eco-float output voltage 1106 may be an output voltage that is equal to or nominally higher than an open-circuit voltage of battery 1126 (e.g., 12.8 to 13.0 volts for a 12-volt battery). Thus, when charger 1100 operates in an eco-float mode, battery charging voltage is reduced to approximately battery open-circuit voltage. Eco-float output voltage 1106 may be maintained for approximately 90-99% of the time that the battery formerly would have been charged on continuous float voltage 1108, resulting in long reduced-voltage periods that prolong the life of the battery separator.

Boost output voltage 1112 may be a relatively high output voltage (e.g., 15.5 volts for a 12-volt battery) that accelerates battery charging either initially or after a discharge event by temporarily increasing the voltage difference between charger 1100 and battery 1126 such that charger 1100 delivers more output current 1122 to battery 1126 than charger 1100 would deliver at float output voltage 1108.

Refresh output voltage 1110 may be an output voltage that is higher than float output voltage 1108, but lower than boost output voltage 1112 (e.g., 14.0 to 14.2 volts for a 12-volt battery). In one embodiment, refresh output voltage 1110 may be derived as a function of float output voltage 1108 and boost output voltage 1112.

While exemplary output voltages have been quantified above, each of eco-float output voltage 1106 ($V_{EF}$), float output voltage 1108 ($V_F$), refresh output voltage 1110 ($V_R$), and boost output voltage 1112 ($V_B$) may be scaled as appropriate for the size of the flooded lead-acid SLI battery being charged (e.g., 12 volt, 24 volt, 48 volt, 120 volt, 240 volt). In addition, monitoring and control circuitry 1114 may include temperature components that enable charge control system 1118 to provide temperature compensation, which incrementally increases output voltage at lower ambient temperatures and incrementally decreases output voltage at higher ambient temperatures to adequately charge but not overcharge battery 1126. Temperature compensation may apply regardless of the particular set output voltage.

Figure 12:
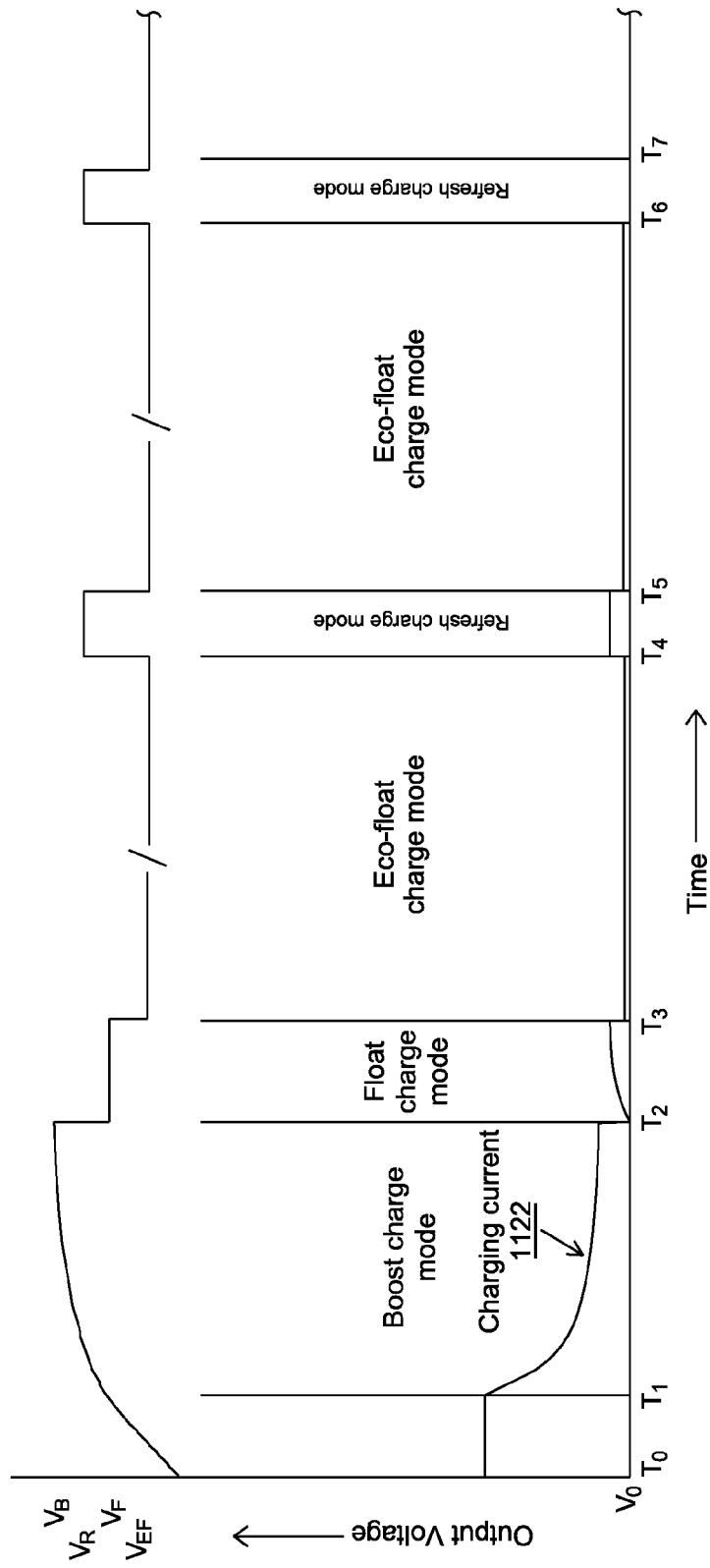
FIG. 12 illustrates a chart depicting a number time-progressed charge mode cycles provided by the charging system of FIG. 11.

FIG. 12 graphically illustrates an exemplary battery-life-extension charging cycle for battery 1126, which has either never been charged or has been deeply discharged. In this embodiment, charging begins at $T_0$ when charger 1100 starts operation in a boost charge mode at boost output voltage 1112 ($V_B$). Charger 1100 may maintain boost output voltage 1112 ($V_B$), delivering up to 15.5 volts until battery 1126 is nearly fully charged at $T_2$. Depending on an initial depth of discharge and other field conditions, the time between $T_0$ and $T_2$ may range from a few minutes to more than twenty-four hours.

At $T_2$, charge control system 1118 may cause a shift to a float charge mode at float output voltage 1108 ($V_F$), based on output current 1122 drawn by battery 1126, as measured by current sensor 1116. In one embodiment, float charge mode may deliver approximately 13.5 output volts and be maintained for a predefined duration governed by timing component 1120 between $T_2$ and $T_3$.

A number of alternatives may be implemented. For example, charger 1100 may start at $T_0$ in a float charge mode at float output voltage 1108 ($V_F$) or a refresh charge mode at refresh output voltage 1110 ($V_R$). Charger 1100 may shift at $T_2$ into eco-float charge mode at eco-float output voltage 1106 ($V_{EF}$) or refresh charge mode at refresh output voltage 1110 ($V_R$).

In the example of FIG. 12, when the float charge mode ends at $T_3$, charger 1100 may transition to the eco-float charge mode at eco-float output voltage 1106 ($V_{EF}$), where it may remain for a programmable time between $T_3$ and $T_4$. In one embodiment, charger 1100 may deliver 12.9 volts in eco-float mode for approximately 96 hours between $T_3$ and $T_4$. If the eco-float charging cycle is interrupted at any point by an AC outage, charger 1100 may either start the overall charging cycle again at $T_0$ or resume operation in the eco-float charge mode at eco-float output voltage 1106 ($V_{EF}$). If the eco-float charging cycle is interrupted at any point by a battery discharge event sufficient to cause charger 1100 to deliver a material percentage of its rated output current 1122 to battery 1126, charger 1100 may enter the boost charge mode at boost output voltage 1112 ($V_B$) for a period governed by charge control system 1118 and timing component 1120, so as to quickly recharge the battery 1126.

If the eco-float charging cycle is not interrupted, the eco-float time period may expire at $T_4$, after which charger 1100 may transition to the refresh charge mode at refresh output voltage 1110 (VR) for a short programmable time between $T_4$ and $T_5$. In one embodiment, charger 1100 may deliver up to 14.2 volts for just less than one hour between $T_4$ and $T_5$. If the refresh charge cycle is interrupted by an AC supply outage or a battery discharge event, charger 1100 may either revert to $T_0$ or resume operation in the active charge mode at the time of the outage, depending on an existing charge status of battery 1100 after the discharge event (i.e., depending on charging output current 1122 delivered to battery 1126). If there is no interruption, charger 1100 may return or revert to eco-float charge mode at $T_5$, where it may remain for approximately 96 additional hours until T6, at which point it may shift to refresh charge mode again for just under one hour. Charger 1100 may alternate between timed intervals in the eco-float and refresh charge modes until there is an interruption due to an AC failure or a battery discharge event, in which case, charger 1100 may revert to $T_0$.

In one embodiment, a charge-mode ratio of time in eco-float charge mode to refresh charge mode may be between 90:10 and 99:1, though this ratio may vary based on the frequency of battery discharge events. The ratio of eco-float charge mode to any other voltage charge mode may be adjusted using any numerical multiplier. For example, if an initial ratio of time in eco-float charge mode to refresh charge mode of 99:1 is employed, and later it is found that a ratio of 90:10 offers superior results, the ratio may be adjusted accordingly. Adjusting the ratio of time in one charge mode versus another does not impact the functional aspects of the battery-life-extension systems and methods.

The battery-life-extension charging cycle shown in FIG. 12 reduces battery charging voltage to approximately battery open-circuit voltage (i.e., eco-float output voltage 1106) for approximately 90% to 99% of the charging time, greatly reducing the battery separator oxidation caused by continuous charging in the float charge mode, preventing early and sometimes catastrophic battery failures, and reducing the operating expense associated with maintaining higher output voltages over time.

Figure 13A:
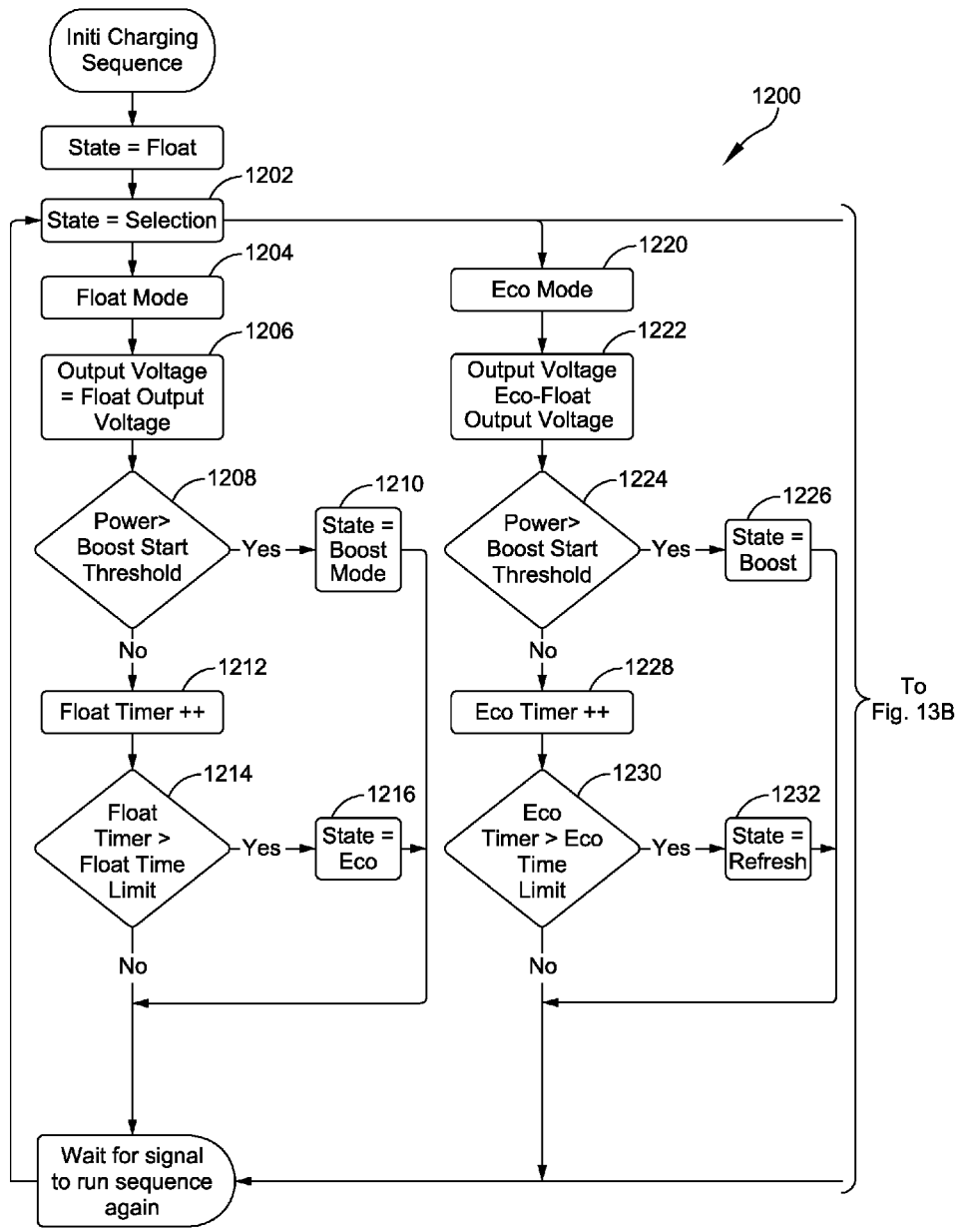
FIGS. 13A-13B combine to provide a charging-state flowchart that illustrates an exemplary battery-life-extension charging method using the charging system of FIG. 11.
Figure 13B:
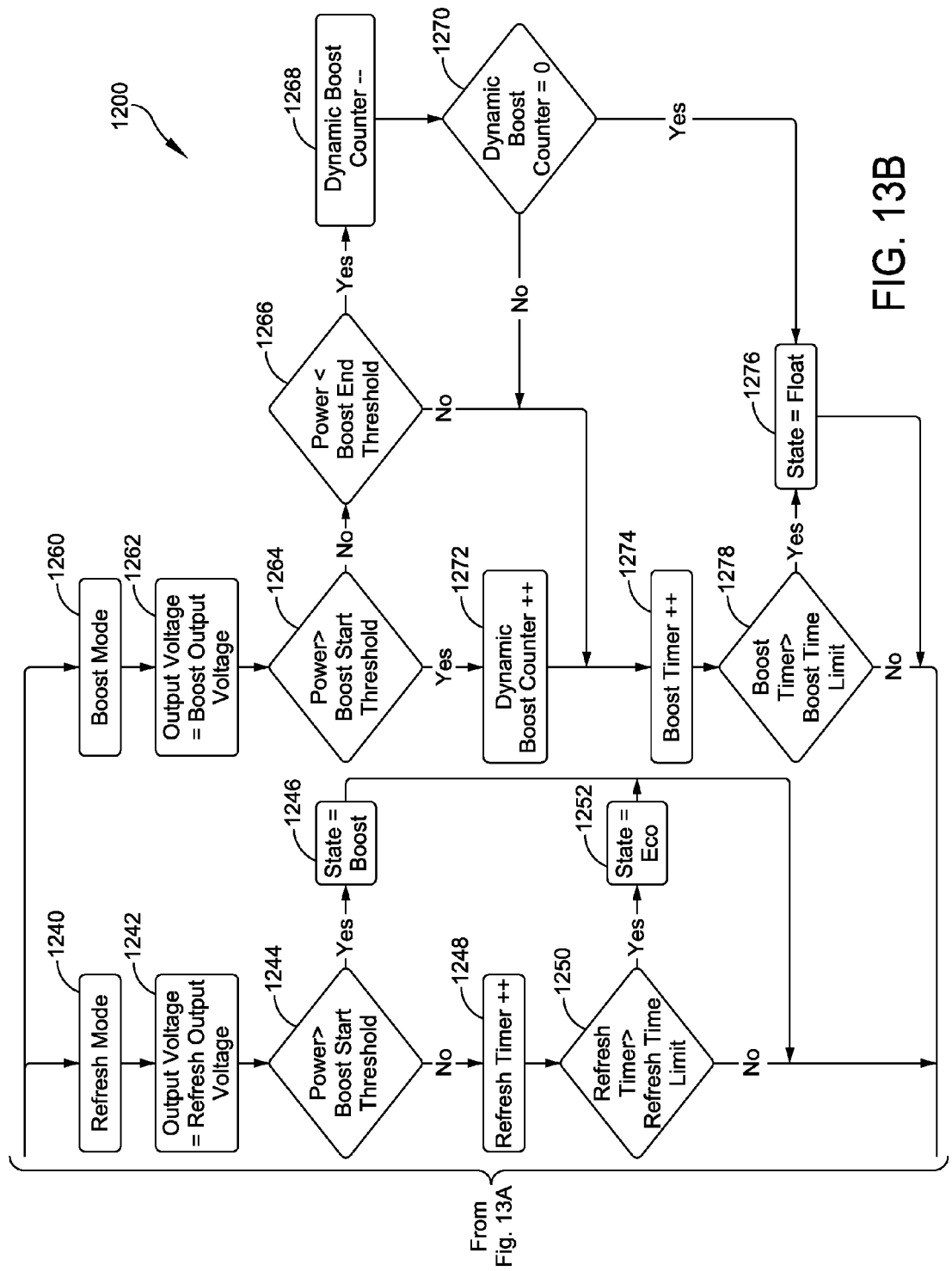

FIGS. 13A-13B combine to provide a charging-state flowchart that illustrates an exemplary battery-life-extension charging method using charging system 1100 (FIG. 11). The method involves four charging modes that correspond to the different charger output voltages discussed above: float, eco-float, refresh, and boost. To begin, a state selection is made at 1202, and charger 1100 is shifted into float mode at 1204, at which time the output voltage is set to float output voltage 1108 ($V_F$) at 1206. If output current/power 1122 drawn/demanded by battery 1126 exceeds a boost-start threshold at 1208, the operating state may shift into boost mode at 1210, and the next pass through the state flowchart may be via a boost mode path, beginning at 1260. If output current/power 1122 demanded by battery 1126 does not exceed the boost-start threshold at 1208, charger 1100 may remain in float mode, and timing component 1120 increments at 1212. If timing component 1120 increments beyond a pre-programmed time limit for operation in float mode at 1214, charger 1100 may shift state into eco mode at 1216, and the next pass through the state flowchart may be via an eco mode path, beginning at 1220. If timing component 1120 does not increment beyond the pre-programmed time limit for operation in float mode, charger 1100 may remain in float mode, and the next pass through the state flowchart will again be through the float mode path, beginning at 1204.

Charger 1100 operates in eco mode, beginning at 1220, after operating in either float mode beginning at 1204 or refresh mode beginning at 1240. Shifting from float mode into eco mode is described above in relation to block 1216. Once in eco mode, in which the output voltage is set to eco-float output voltage 1106 at 1222, if the output current/power 1122 demanded by battery 1126 exceeds the boost-start threshold at 1224, the operating state of charger 1100 may shift into boost mode at 1226, and the next pass through the state flowchart may be via the boost mode path, beginning at 1260. If output power 1122 demanded by battery 1126 does not exceed the boost-start threshold at 1224, charger 1100 may remain in eco mode, and timing component 1120 increments at 1228. If timing component 1120 increments beyond a pre-programmed time limit for operation in eco mode at 1230, charger 1100 may shift operating state into refresh mode at 1232, and the next pass through the state flowchart may be through the refresh mode path, beginning at 1240. If timing component 1120 does not increment beyond the pre-programmed time limit for operation in eco mode, charger 1100 may remain in eco mode, and the next pass through the state flowchart will again be through the eco mode path, beginning at 1220.

Charger 1100 operates in refresh mode after charger 1100 has timed out of eco mode. Once in refresh mode, in which output voltage is set to refresh output voltage 1110 at 1242, if the output current/power 1122 demanded by battery 1126 exceeds the boost-start threshold at 1244, the operating state of charger 1100 may shift into boost mode at 1246, and the next pass through the state flowchart may be via the boost mode path, beginning at 1260. If output power 1122 demanded by battery 1126 does not exceed the boost-start threshold at 1244, charger 1100 may remain in refresh mode, and timing component 1120 increments at 1248. If timing component 1120 increments beyond a pre-programmed time limit for operation in refresh mode at 1250, charger 1100 may shift operating state into eco mode at 1252, and the next pass through the state flowchart may be through the eco mode path, beginning at 1220. If timing component 1120 does not increment beyond the pre-programmed time limit for operation in refresh mode, charger 1100 may remain in refresh mode, and the next pass through the state flowchart will again be through the refresh mode path, beginning at 1240.

Charger 1100 operates in boost mode after an output power 1122 demanded by battery 1126 exceeds the boost-start threshold when charger 1100 is operating in any of the other modes at 1208, 1224, or 1244. Shifting into boost mode, beginning at 1260, from any of the other modes is described above. Once in boost mode, in which the output voltage is set to boost output voltage 1112 at 1262, if the output current/power 1122 demanded by battery 1126 exceeds the boost-start threshold at 1264, the operating state remains in boost mode. A "dynamic boost counter" of timing component 1120 may increment at 1272 to begin computing, for later use, a maximum time value that charger 1100 may remain in boost mode once the output current 1122 demanded by battery 1126 drops below the boost-start threshold. Simultaneously, a "boost timer" of timing component 1120 may begin incrementing at 1274 for purposes of limiting a maximum time that charger 1100 may remain in boost mode, regardless of the existing charge status of battery 1126. If the boost timer exceeds the maximum time for operation in the boost mode, or a boost time limit, at 1278, the operating state may shift to float mode at 1276, and the next pass through the state flowchart will be through the float mode path, beginning at 1204.

Returning to 1264, if the output current/power 1122 demanded by battery 1126 is below the boost-start threshold at 1264, charger 1100 may remain in boost mode. If the output power 1122 demanded by battery 1126 falls below a boost-end threshold to remain in boost mode at 1266, the "dynamic boost counter" that began incrementing at 1272 may begin to decrement at 1268 from the maximum time value it reached after incrementing, as described above. The next pass through the state flowchart will be through the boost mode path, beginning at 1260. When the output power 1122 demanded by battery 1126 is below the boost-end threshold, and the dynamic boost counter has reached 0, or decremented to a predetermined fraction of the time that the dynamic boost counter had been incrementing, at 1270, the operating state may shift into float mode at 1276. The next pass through the state flowchart will be through the float mode path, beginning at 1204.

While method 1200 is presented in terms of applying all four output voltages, eco-float voltage 1106 ($V_{EF}$), float voltage 1108 ($V_F$), refresh voltage 1110 ($V_R$), and/or boost voltage 1112 ($V_B$) in a manner that leverages charge/power measurements and time measurements to ensure a continually fully-charged battery 1126, while at the same time reducing the battery charging voltage to approximately battery open-circuit voltage (i.e., eco-float output voltage 1106) for approximately 90% to 99% of the charging time, it should be understood that embodiments of battery-life-extensions methods and system may exclude one or more of the pre-set output voltages. For example, charger 1100 may shift directly from boost charge mode at boost voltage 1112 ($V_B$) to eco-float charge mode at eco-float voltage 1106 ($V_{EF}$). In another example, boost charge mode may be excluded, such that battery 1126 is recharged after a discharge event in refresh charge mode.

By employing a charging regime that alternates between eco-float output voltage 1106, float output voltage 1108, refresh output voltage 1110, and boost output voltage 1112 at precise times and in a manner that maintains battery 1126 in a fully charged state while reducing battery charging voltage to approximately battery open-circuit voltage (i.e., eco-float output voltage 1106) for approximately 90-99% of the time, embodiments of the battery-life-extension charging systems and methods emulate the intermittent type of charging used for SLI batteries installed in vehicles. The disclosed charging regime charges battery 1126 in a manner that meets regulatory requirements mandating the continuous charging of SLI batteries used to start emergency generators and diesel-powered fire pumps, while maintaining an advantageous ratio of charging time at the near open-circuit eco-float battery voltage 1106 ($V_{EF}$) to time spent at higher voltages such as float voltage 1108 ($V_F$), refresh voltage 1110 ($V_R$), and/or boost voltage 1112 ($V_B$).

Embodiments of the battery-life-extension systems and methods greatly diminish the separator oxidation caused by continuous charging at the float voltage and also by overcharging in general, optimizing battery life and allowing all battery components to fail gradually and at the same rate. Avoiding separator failure also prevents catastrophic battery failure caused by short circuits between the positive and negative electrodes of the battery's galvanic cell, providing a safer and more environmentally sound charging solution. This substantial increase in battery life means that batteries require less frequent removal and recycling, resulting in a replacement cost savings to users. In addition, because a lower output voltage is used to charge the battery for a majority of the time, there is a reduction in electrical power consumed by the charger, and therefore a reduction in operating costs seen over the charger's lifetime. Charging the battery at the lower eco-float output voltage for the majority of the time also reduces the rate at which the battery consumes water, which enables longer maintenance intervals in batteries with removable vent caps and longer battery life in flooded batteries without vent caps.

To implement embodiments of the battery-life-extension methods during charger system operation, a user may select or deselect a battery-life-extension option using a graphical user interface (GUI) or a keypad located on an outer panel of charger 1100 or a power supply system containing charger 1100. The user may navigate through a selection menu and use a keypad and/or up and down arrows to make selections. Alternatively, a user's computing device may be connected to charger 1100 or an associated power supply system, such that the user may make selections via a battery-life-extension application that has been downloaded and installed onto the computing device. Once battery-life-extension mode has been selected, the battery-life-extension method may be automatically implemented without further need for operator intervention.

Embodiments of battery-life-extension method 1200 may be implemented in charging system 1100 of FIG. 11, charging systems 500 and 1000 of FIGS. 1-10, as well as other microprocessor-controlled battery chargers, charge controllers, or power conversion devices. The battery-life-extension function may be implemented on different types of microprocessors and microcontrollers, and with different lines of microcode, and method 1200 may be implemented in battery chargers employing any means to regulate output power, including, but not limited to, thyristor-controlled battery chargers, switch-mode battery chargers, controlled ferro-resonant battery chargers, and battery chargers with variable electro-mechanical power generating means. Method 1200 may be employed in battery chargers with or without galvanic isolation and in chargers using AC electrical power, DC electrical power, or mechanical motion as an input power source. Method 1200 may be implemented on battery chargers designed to charge batteries (or battery sets, battery strings, or battery stacks) of different sizes.

Embodiments of battery-life-extension charging method 1200 may be implemented using a circuit comprised of standard logic elements instead of a processor-executed algorithm or computer program. Charging method implementations may also involve an integrated circuit implementation of the standard logic elements, such as a field-programmable gate array (FPGA).

Embodiments of battery-life-extension charging method 1200 may also be implemented using mechanical mechanisms, including, for example, a clockwork timer, tally counter (similar to an automotive odometer), a mechanical calculating device (similar to those used in adding machines), etc. Electro-mechanical means may also be employed (e.g., a stepping relay, an electro-mechanical tally counter).

The terms "microprocessor," "microcontroller," and "digital signal processing" are intended to be as general as possible, referring to an electronic component that has digital (and usually also analog) inputs and outputs. A microcontroller or DSP can be implemented using one or more electronic device connected together and interconnected with other control circuitry inside of the battery charger.

The terms "timer" and "counter" are likewise intended to be as general as possible. The battery charger's timing functions can be implemented in the microcontroller and therefore there's no need for a separate piece of hardware that is a timer or that functions only as a timer.

The terms "charger" and "battery charger" are intended to be descriptive of an electronic finished product that is housed in an enclosure and has electrical input, output, and user controls. Such battery chargers accept either sinusoidal AC input power or DC input power, and provide rectified and regulated DC output power which may be filtered or unfiltered.

Thus, although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A battery-life-extension charging system, comprising:
    a monitoring component configured to measure a direct current (DC) output current delivered by the charging system to a battery, wherein the DC output current is a function of an existing charge status of the battery;
    a timing component; and
    a charge control system in communication with the monitoring component and the timing component, the charge control system configured for:
        obtaining at least one of a time measurement from the timing component and a charge measurement from the monitoring component;
        based on the at least one of the time measurement and the charge measurement, determining at least one of a time to complete the charge mode cycle and a charge to complete a charge mode cycle, each tailored to achieve a desired charge status of the battery; and based on at least one of the determined time and the determined charge to complete the charge mode cycle, transitioning to a select one of a number of DC output voltage settings until the determined time to complete the determined charge mode cycle has passed or the charge to complete the charge mode cycle has been provided, wherein the DC output voltage settings include at least an eco-float output voltage setting, a refresh output voltage setting, and a boost output voltage setting.

2. The battery-life-extension charging system of claim 1, wherein the charge control system is further configured for continually repeating the obtaining the at least one of a time measurement and a charge measurement, the determining at least one of a time to complete a charge mode cycle and a charge to complete the charge mode cycle, and the transitioning to a select one of a number of the DC output voltage settings.

3. The battery-life-extension charging system of claim 2, wherein the DC output voltage settings further include a float output voltage setting.

4. The battery-life-extension charging system of claim 3, wherein:
the eco-float output voltage setting comprises an eco-float output voltage that is equal to or nominally higher than an open-circuit voltage of the battery;
the float output voltage setting comprises a float output voltage that offsets at least a rate of self-discharge of the battery;
the boost output voltage setting comprises a boost output voltage that is equal to a maximum voltage required to accelerate battery charging; and
the refresh output voltage setting comprises a refresh output voltage that is higher than the float output voltage and lower than the boost output voltage.

5. The battery-life-extension charging system of claim 3, wherein a first time to complete a first charge mode cycle in the refresh output voltage setting comprises between 1% and 10% of a second time to complete a second charge mode cycle in the eco-float output voltage setting.

6. The battery-life-extension charging system of claim 1, wherein:
the monitoring component comprises a DC current sensor integrated within a monitoring and control circuitry of the charging system; and
the timing component is one or more of a timer, a clock, or a counter integrated within the monitoring and control circuitry of the charging system.

7. The battery-life-extension charging system of claim 1, wherein the battery is a flooded lead-acid starting, lighting, and ignition (SLI) battery.

8. The battery-life-extension charging system of claim 1, wherein the DC output current delivered by the charging system also powers an accessory DC load.

9. A battery-life-extension charging method of a charging system, the method comprising:
obtaining a charge measurement associated with a battery via a monitoring component of a battery charger, the charge measurement reflecting a direct current (DC) output current delivered by the battery charger to the battery;
obtaining a time measurement associated with the battery via a timing component of the battery charger;
transmitting at least one of the charge measurement and the time measurement to a battery charge control system of the battery charger;
determining, by the battery charge control system and based on at least one of the charge measurement and the time measurement, at least one of a charge to complete a charge mode cycle and a time to complete the charge mode cycle, the charge mode cycle is tailored to achieve a desired charge status of the battery; and
selectively regulating, by a voltage regulator in communication with the battery charge control system, a DC output voltage of the battery charger to one of a number of pre-set DC output voltages until the time to complete the charge mode cycle has passed or the charge to complete the charge mode cycle has been provided, the pre-set DC output voltages comprising an eco-float output voltage, a refresh output voltage, and a boost output voltage.

10. The battery-life-extension charging method of claim 9, wherein the pre-set DC output voltages further comprise a float output voltage.

11. The battery-life-extension charging method of claim 10, wherein:
the eco-float output voltage comprises a voltage equal to or nominally higher than an open-circuit voltage of the battery;
the float output voltage comprises a voltage that offsets at least a rate of self-discharge of the battery;
the boost output voltage comprises a voltage equal to a maximum voltage required to accelerate battery charging; and
the refresh output voltage comprises a voltage higher than the float output voltage and lower than the boost output voltage.

12. The battery-life-extension charging method of claim 9, wherein:
the monitoring component comprises a DC current sensor integrated within a monitoring and control circuitry of the charging system; and
the timing component comprises one of a timer, a clock, or a counter integrated within the monitoring and control circuitry of the charging system.

13. An automatic, self-contained, battery-life-extension charging system, comprising:
a power printed circuit board (PCB) comprising:
input connections to allow an input alternating current (AC) to flow into the charging system;
two series-connected switchmode converters that together are configured to convert the input AC into an output direct current (DC) for delivery to a DC load, to limit the output DC to the DC load, and to regulate a DC output voltage; and
monitoring and control circuitry in communication with the two series-connected switchmode converters, the monitoring and control circuitry comprising:
a monitoring component configured to measure a charge measurement associated with the DC load;
a timing component configured to measure a time measurement associated with a charge mode cycle of the DC load; and
a charge control system in communication with the monitoring component and the timing component, the charge control system configured to transition the two series-connected switchmode converters between a number of DC output voltage charge modes based upon at least one of the charge measurement and the time measurement.

14. The automatic, self-contained, battery-life-extension charging system of claim 13, wherein the charge measurement reflects the output DC delivered by the two series-connected switchmode converters to the DC load, and wherein the output DC is a function of an existing charge status of the DC load.

15. The automatic, self-contained, battery-life-extension charging system of claim 13, wherein of the DC output voltage charge modes include:
- an eco-float charge mode in which the DC output voltage comprises a voltage equal to or nominally higher than an open-circuit voltage of the DC load;
- a float charge mode in which the DC output voltage comprises a voltage that offsets at least a rate of self-discharge of the DC load;
- a boost charge mode in which the DC output voltage comprises a float output voltage equal to a maximum voltage required to accelerate charging of the DC load; and
- a refresh charge mode in which the DC output voltage comprises a boost output voltage higher than the float output voltage and lower than the boost output voltage.

16. The automatic, self-contained, battery-life-extension charging system of claim 15, wherein the timing component causes the charge control system to maintain a charge-mode ratio of the eco-float charge mode to the refresh charge mode that is between 90:10 and 99:1.

17. The automatic, self-contained, battery-life-extension charging system of claim 13, wherein the two series-connected switchmode converters are further configured to provide an active power factor correction so as to provide an improved power factor, provide an electrical isolation between a primary circuitry and a secondary circuitry, and provide output connections configured for wiring the output DC to the DC load.

18. The automatic, self-contained, battery-life-extension charging system of claim 17, wherein the two series-connected switchmode converters combine to form a two-stage switchmode converter, the two-stage switchmode converter comprising an active circuitry for controlling an amount of the input AC to maintain a sinusoidal waveform in phase with an input voltage waveform to provide the active power factor correction.

19. The automatic, self-contained, battery-life-extension charging system of claim 13, further comprising an accessory PCB electrically connected to the power PCB, the accessory PCB and the power PCB housed in a common enclosure, the accessory PCB further comprising a liquid crystal diode (LCD) display, one or more alarm output relays, and/or a controller area network bus (CANbus) interface.

20. The automatic, self-contained, battery-life-extension charging system of claim 13, wherein the DC load comprises at least one of a flooded lead-acid starting-lighting-ignition (SLI) battery to be charged, another electrical storage device to be charged, and an accessory DC load to be powered.

* * * * *

US009948125C1

(12) EX PARTE REEXAMINATION CERTIFICATE (211th)
Ex Parte Reexamination Ordered under 35 U.S.C. 257

United States Patent
Groat et al.

(10) Number: US 9,948,125 C1
(45) Certificate Issued: *Mar. 30, 2022

(54) SYSTEMS AND METHODS FOR SELF-CONTAINED AUTOMATIC BATTERY CHARGING AND BATTERY-LIFE-EXTENSION CHARGING

(71) Applicant: Stored Energy Systems, a Limited Liability Company, Longmont, CO (US)

(72) Inventors: Timothy Groat, Berthoud, CO (US); Kyle Miller, Arvada, CO (US); John Flavin, Golden, CO (US); William Kaewert, Longmont, CO (US)

(73) Assignee: STORED ENERGY SYSTEMS, A LIMITED LIABILITY COMPANY, Longmont, CO (US)

Supplemental Examination Request:
No. 96/000,364, Jun. 23, 2021

Reexamination Certificate for:
Patent No.: 9,948,125
Issued: Apr. 17, 2018
Appl. No.: 15/258,371
Filed: Sep. 7, 2016

( * ) Notice: This patent is subject to a terminal disclaimer.

Related U.S. Application Data

(63) Continuation-in-part of application No. 14/536,368, filed on Nov. 7, 2014, now Pat. No. 9,466,995.

(60) Provisional application No. 61/901,104, filed on Nov. 7, 2013.

(51) Int. Cl.
H02J 7/00 (2006.01)
H02M 7/04 (2006.01)
H02J 7/02 (2016.01)

(52) U.S. Cl.
CPC ............ *H02J 7/007* (2013.01); *H02J 7/0045* (2013.01); *H02J 7/0071* (2020.01); *H02J 7/00714* (2020.01); *H02J 7/02* (2013.01); *H02J 7/00* (2013.01); *H02J 7/0029* (2013.01); *H02J 7/0047* (2013.01); *H02J 7/0049* (2020.01); *H02J 2207/20* (2020.01)

(58) Field of Classification Search
None
See application file for complete search history.

(56) References Cited

To view the complete listing of prior art documents cited during the supplemental examination proceeding and the resulting reexamination proceeding for Control Number 96/000,364, please refer to the USPTO's public Patent Application Information Retrieval (PAIR) system under the Display References tab.

*Primary Examiner* — Luke S Wassum

(57) ABSTRACT

The disclosure provides embodiments of a self-contained automatic battery charging system having a power printed circuit board (PCB) that enables inputting an alternating current (AC) power flow to the automatic battery charging system. A first switchmode converter converts an AC input power to a direct current (DC) power, thereby providing an active power factor correction. The first switchmode converter comprises an isolation transformer, which provides an electrical isolation between a primary circuitry and a secondary circuitry of the automatic battery charging system. A second switch mode converter regulates a system output voltage and limits a system output current to an electrical load. A DC output is connected to a battery, another electrical storage device, and/or a parallel-connected DC load to be powered. An optional accessory PCB electrically connects to the power PCB and provides features including a liquid crystal display (LCD), alarm output relay(s), and/or a controller area network bus (CANbus) interface. The automatic battery charging system can implement a battery-life-extension charging regime. Other embodiments are disclosed.

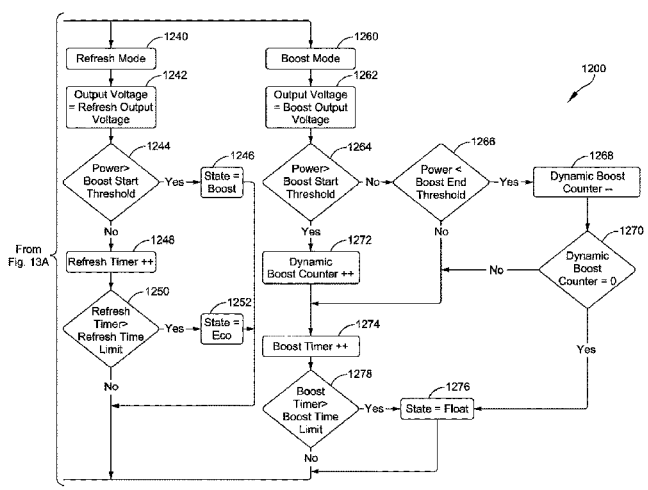

US 9,948,125 C1

EX PARTE
REEXAMINATION CERTIFICATE

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 15 is cancelled.

Claims 1, 4, 9, 11, 13 and 16 are determined to be patentable as amended.

Claims 2, 3, 5-8, 10, 12, 14 and 17-20, dependent on an amended claim, are determined to be patentable.

1. A battery-life-extension charging system, comprising:
   a monitoring component configured to measure a direct current (DC) output current delivered by the charging system to a battery, wherein the DC output current is a function of an existing charge status of the battery;
   a timing component; and
   a charge control system in communication with the monitoring component and the timing component, the charge control system configured for:
   obtaining at least one of a time measurement from the timing component and a charge measurement from the monitoring component;
   based on the at least one of the time measurement and the charge measurement, determining at least one of a time to complete the charge mode cycle and a charge to complete a charge mode cycle, each tailored to achieve a desired charge status of the battery; and
   based on at least one of the determined time and the determined charge to complete the charge mode cycle, transitioning to a select one of a number of DC output voltage settings until the determined time to complete the determined charge mode cycle has passed or the charge to complete the charge mode cycle has been provided, wherein the DC output voltage settings include at least an eco-float output voltage setting, a refresh output voltage setting, and a boost output voltage setting, *wherein the eco-float output voltage setting comprises a voltage equal to or nominally higher than an open-circuit voltage of the battery*.

4. The battery-life-extension charging system of claim 3, wherein:
   [the eco-float output voltage setting comprises an eco-float output voltage that is equal to or nominally higher than an open circuit voltage of the battery;]
   the float output voltage setting comprises a float output voltage that offsets at least a rate of self-discharge of the battery;
   the boost output voltage setting comprises a boost output voltage that is equal to a maximum voltage required to accelerate battery charging; and
   the refresh output voltage setting comprises a refresh output voltage that is higher than the float output voltage and lower than the boost output voltage.

9. A battery-life-extension charging method of a charging system, the method comprising:
   obtaining a charge measurement associated with a battery via a monitoring component of a battery charger, the charge measurement reflecting a direct current (DC) output current delivered by the battery charger to the battery;
   obtaining a time measurement associated with the battery via a timing component of the battery charger;
   transmitting at least one of the charge measurement and the time measurement to a battery charge control system of the battery charger;
   determining, by the battery charge control system and based on at least one of the charge measurement and the time measurement, at least one of a charge to complete a charge mode cycle and a time to complete the charge mode cycle, the charge mode cycle is tailored to achieve a desired charge status of the battery; and
   selectively regulating, by a voltage regulator in communication with the battery charge control system, a DC output voltage of the battery charger to one of a number of pre-set DC output voltages until the time to complete the charge mode cycle has passed or the charge to complete the charge mode cycle has been provided, the pre-set DC output voltages comprising an eco-float output voltage, a refresh output voltage, and a boost output voltage, *wherein the eco-float output voltage comprises a voltage equal to or nominally higher than an open-circuit voltage of the battery*.

11. The battery-life-extension charging method of claim 10, wherein:
   [the eco-float output voltage comprises a voltage equal to or nominally higher than an open-circuit voltage of the battery;]
   the float output voltage comprises a voltage that offsets at least a rate of self-discharge of the battery;
   the boost output voltage comprises a voltage equal to a maximum voltage required to accelerate battery charging; and
   the refresh output voltage comprises a voltage higher than the float output voltage and lower than the boost output voltage.

13. An automatic, self-contained, battery-life-extension charging system, comprising:
   a power printed circuit board (PCB) comprising:
   input connections to allow an input alternating current (AC) to flow into the charging system;
   two series-connected switchmode converters that together are configured to convert the input AC into an output direct current (DC) for delivery to a DC load, to limit the output DC to the DC load, and to regulate a DC output voltage; and
   monitoring and control circuitry in communication with the two series-connected switchmode converters, the monitoring and control circuitry comprising:
   a monitoring component configured to measure a charge measurement associated with the DC load;
   a timing component configured to measure a time measurement associated with a charge mode cycle of the DC load; [and]
   a charge control system in communication with the monitoring component and the timing component, the charge control system configured to transition the two series-connected switchmode converters between a number of DC output voltage charge modes based upon at least one of the charge measurement and the time measurement, *and*
   *wherein of the DC output voltage charge modes include:*
   *an eco-float charge mode in which the DC output voltage comprises a voltage equal to or nominally higher than an open-circuit voltage of the DC load;*

*a float charge mode in which the DC output voltage comprises a voltage that offsets at least a rate of self-discharge of the DC load;*

*a boost charge mode in which the DC output voltage comprises a boost output voltage equal to a maximum voltage required to accelerate charging of the DC load; and*

*a refresh charge mode in which the DC output voltage comprises a refresh output voltage higher than the float output voltage and lower than the boost output voltage.*

16. The automatic, self-contained, battery-life-extension charging system of claim [15] *13*, wherein the timing component causes the charge control system to maintain a charge-mode ratio of the eco-float charge mode to the refresh charge mode that is between 90:10 and 99:1.

\* \* \* \* \*